US 8,874,879 B2

(12) United States Patent
Ge et al.

(10) Patent No.: US 8,874,879 B2
(45) Date of Patent: Oct. 28, 2014

(54) VECTOR PROCESSING CIRCUIT, COMMAND ISSUANCE CONTROL METHOD, AND PROCESSOR SYSTEM

(75) Inventors: Yi Ge, Kawasaki (JP); Yoshimasa Takebe, Kawasaki (JP); Hiromasa Takahashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 389 days.

(21) Appl. No.: 13/279,482

(22) Filed: Oct. 24, 2011

(65) Prior Publication Data

US 2012/0124332 A1    May 17, 2012

(30) Foreign Application Priority Data

Nov. 11, 2010   (JP) .................................. 2010-252839

(51) Int. Cl.
G06F 9/00    (2006.01)
G06F 9/30    (2006.01)
G06F 9/38    (2006.01)

(52) U.S. Cl.
CPC .......... *G06F 9/30014* (2013.01); *G06F 9/3836* (2013.01); *G06F 9/30149* (2013.01)
USPC ............... 712/215; 712/7; 712/210; 712/216; 712/218

(58) Field of Classification Search
CPC .............. G06F 9/30036; G06F 9/3885; G06F 9/30149; G06F 9/3838; G06F 9/3824; G06F 9/3836
USPC ............................... 712/7, 210, 216, 218, 215
See application file for complete search history.

(56) References Cited

U.S. PATENT DOCUMENTS

| 4,541,046 | A | * | 9/1985 | Nagashima et al. | 712/3 |
| 4,621,324 | A | * | 11/1986 | Ushiro et al. | 712/5 |
| 4,771,380 | A | * | 9/1988 | Kris | 712/6 |
| 4,860,245 | A | * | 8/1989 | Kinoshita | 712/4 |
| 5,073,970 | A | * | 12/1991 | Aoyama et al. | 712/7 |
| 5,301,331 | A | | 4/1994 | Ueno et al. | |

(Continued)

FOREIGN PATENT DOCUMENTS

JP    02-304676 A    12/1990
JP    06-028388 A    2/1994

(Continued)

OTHER PUBLICATIONS

Japanese Office Action issued Jul. 22, 2014; Application No. 2010-252839, with Englsih Translation.

*Primary Examiner* — Aimee Li
(74) *Attorney, Agent, or Firm* — Arent Fox LLP

(57) ABSTRACT

A vector processing circuit includes a vector register file including a plurality of array elements, a command issuance control circuit, and a plurality of pipeline arithmetic units. Each pipeline arithmetic unit performs arithmetic processing of data stored in the array elements indicated as a source by one command in parts through a plurality of cycles and stores the result in the array elements indicated as a destination by the one command through a plurality of cycles. When data word length of a preceding command is longer than that of a subsequent command, the command issuance control circuit changes data sizes of the array elements in accordance with data word length of the command and determines whether there is register interference between the array element to be processed at a non-head cycle of the preceding command, and the array element to be processed at a head cycle of the subsequent command.

19 Claims, 18 Drawing Sheets

(56) References Cited

U.S. PATENT DOCUMENTS

| | | | |
|---|---|---|---|
| 5,430,884 A * | 7/1995 | Beard et al. | 712/3 |
| 5,544,337 A * | 8/1996 | Beard et al. | 712/4 |
| 5,689,653 A * | 11/1997 | Karp et al. | 712/222 |
| 5,881,307 A * | 3/1999 | Park et al. | 712/23 |
| 5,922,066 A * | 7/1999 | Cho et al. | 712/204 |
| 5,941,980 A * | 8/1999 | Shang et al. | 712/204 |
| 6,006,315 A | 12/1999 | Park | |
| 6,065,105 A * | 5/2000 | Zaidi et al. | 712/23 |
| 6,795,908 B1 * | 9/2004 | Lee et al. | 712/4 |
| 7,325,124 B2 * | 1/2008 | Altman et al. | 712/216 |
| 7,437,521 B1 * | 10/2008 | Scott et al. | 711/151 |
| 7,496,733 B2 * | 2/2009 | Altman et al. | 712/216 |
| 7,660,967 B2 * | 2/2010 | Hutson | 712/9 |
| 8,555,034 B2 * | 10/2013 | Damron | 712/210 |
| 2010/0115233 A1 * | 5/2010 | Brewer et al. | 712/7 |
| 2011/0087859 A1 * | 4/2011 | Mimar | 712/4 |

FOREIGN PATENT DOCUMENTS

| | | |
|---|---|---|
| JP | 6-110686 | 4/1994 |
| JP | 07-086838 B | 9/1995 |
| JP | 10-124313 | 5/1998 |
| JP | 10-187661 A | 7/1998 |
| JP | 2006-285721 A | 10/2006 |

* cited by examiner

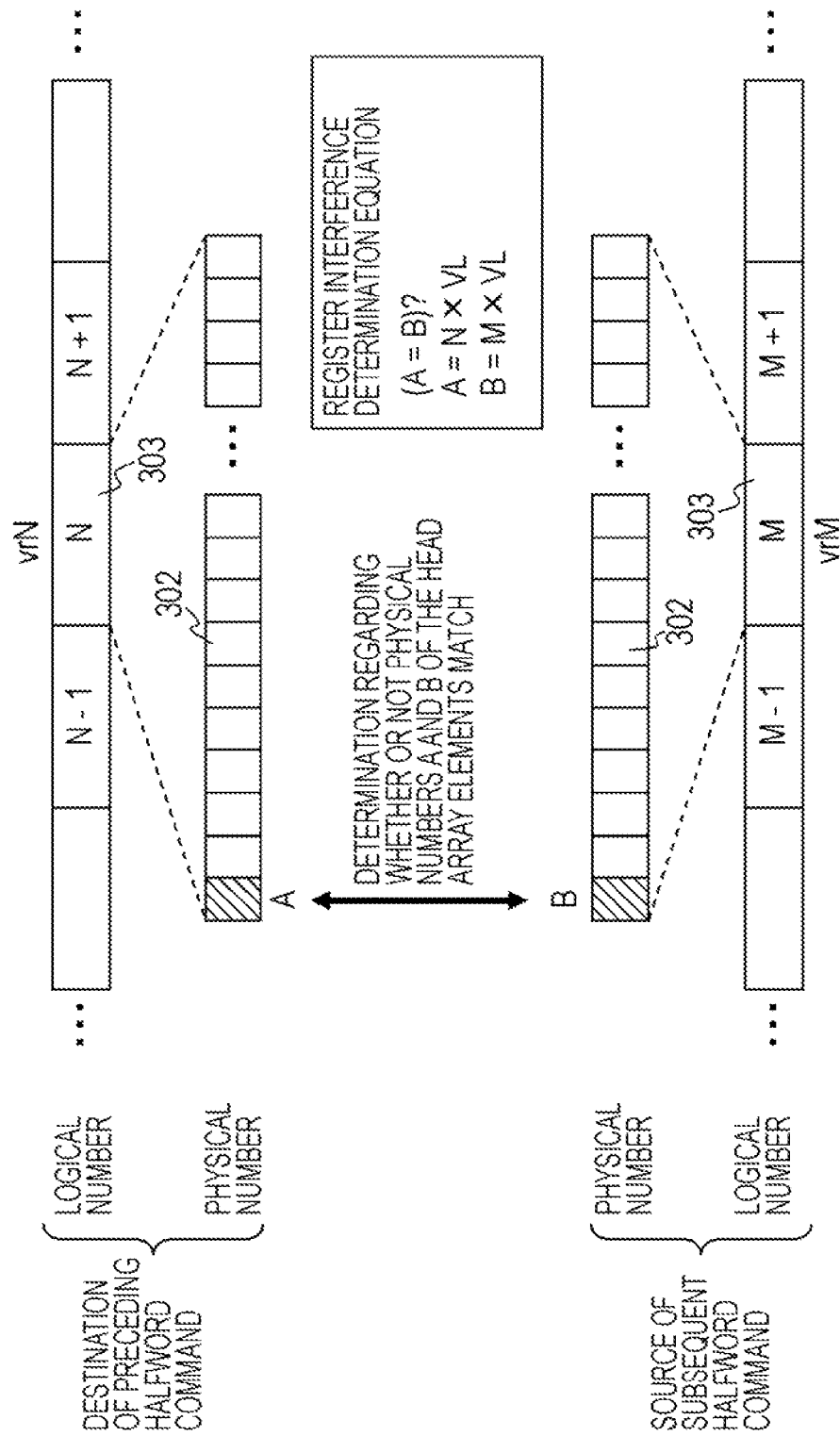

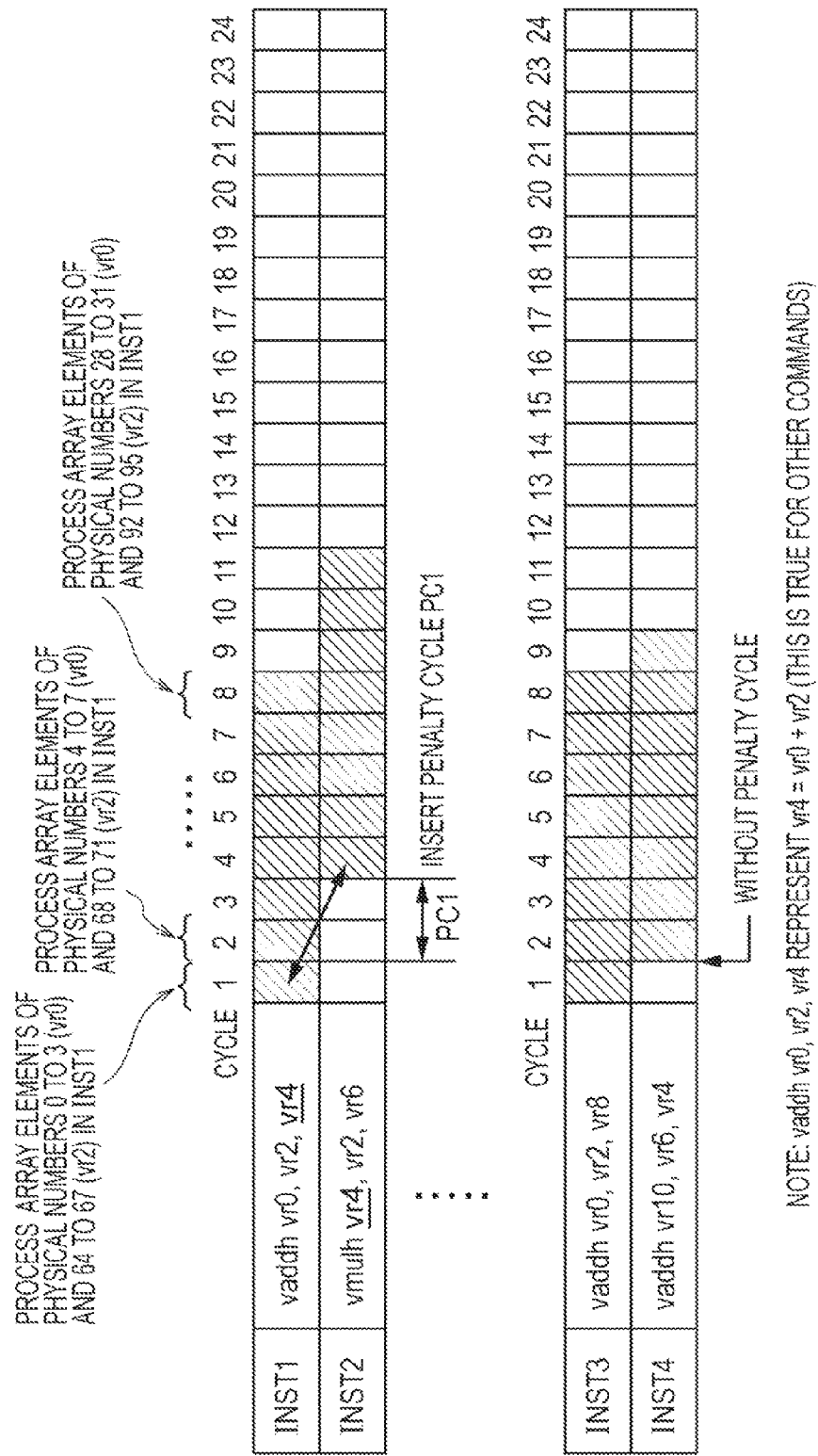

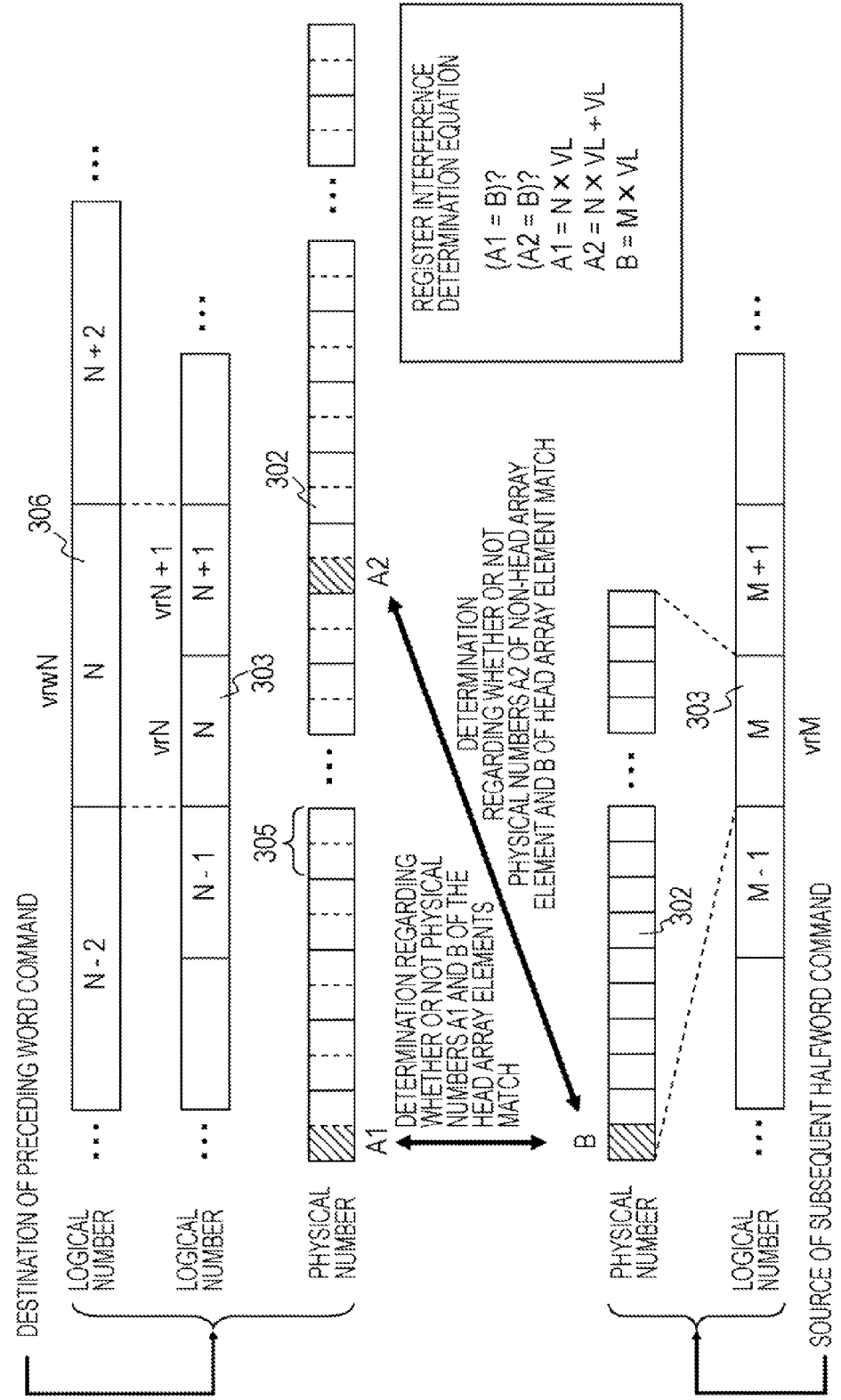

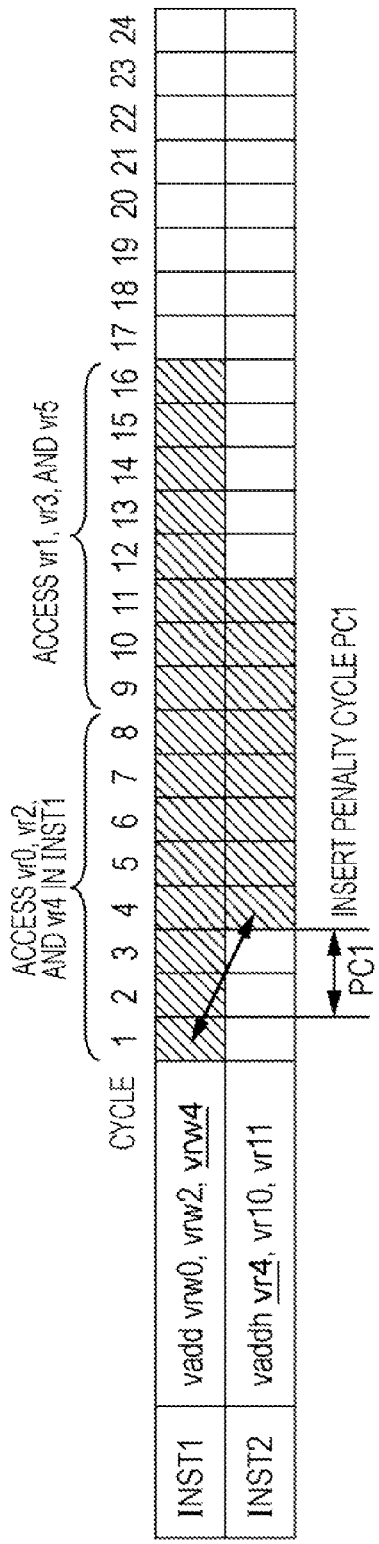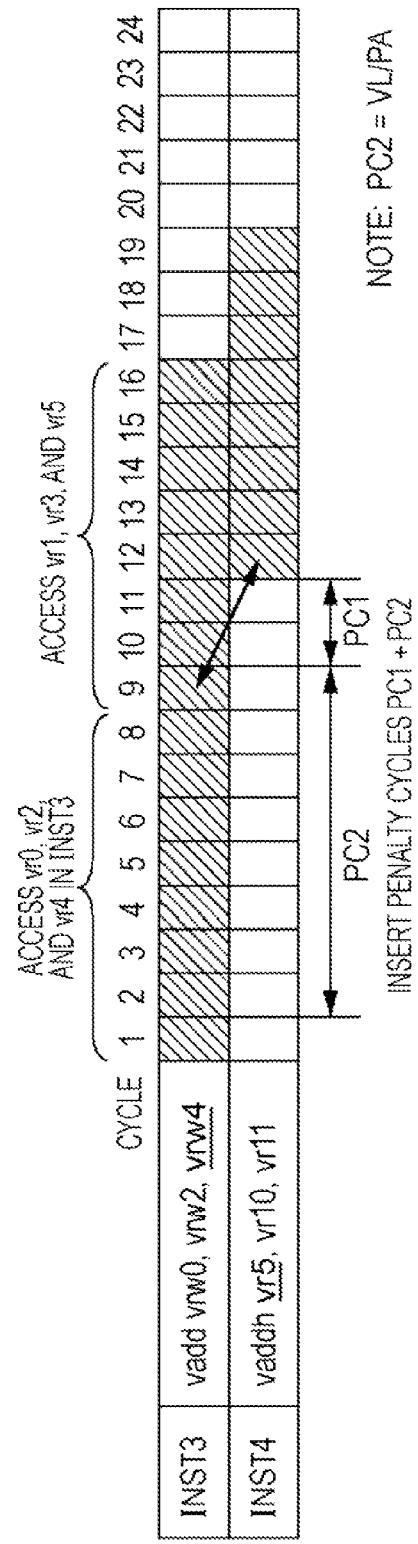

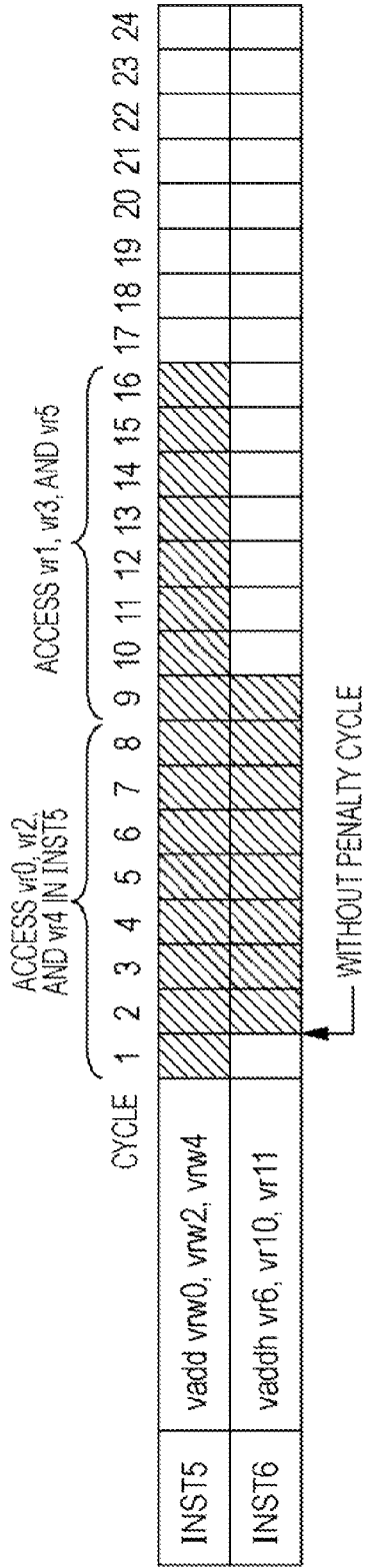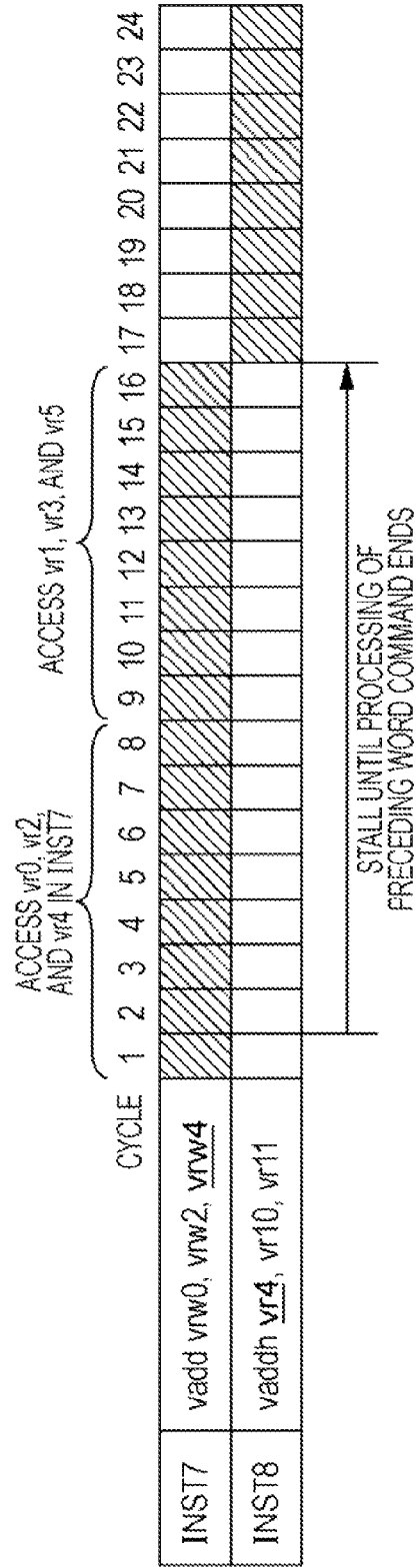

FIG. 11A

| WITH OR WITHOUT REGISTER INTERFERENCE | ISSUANCE DETERMINATION VALUE |
|---|---|
| WITHOUT INTERFERENCE | 0 |
| FIRST HALF ARRAY REGISTER vrN OF PRECEDING WORD COMMAND INTERFERES (PHYSICAL NUMBERS A1 AND B MATCH IN FIG. 7) | PC1 - DC |
| SECOND HALF ARRAY REGISTER vrN+1 OF PRECEDING WORD COMMAND INTERFERES (PHYSICAL NUMBERS A2 AND B MATCH IN FIG. 7) | PC1 + PC2 - DC |

FIG. 11B

| WITH OR WITHOUT REGISTER INTERFERENCE | ISSUANCE DETERMINATION VALUE |
|---|---|
| WITHOUT INTERFERENCE | 0 |
| WITH INTERFERENCE (PHYSICAL NUMBERS N(P) AND M(P) MATCH IN FIG. 5) | PC1 - DC |

VECTOR PROCESSING CIRCUIT, COMMAND ISSUANCE CONTROL METHOD, AND PROCESSOR SYSTEM

CROSS-REFERENCE TO RELATED APPLICATION

This application is based upon and claims the benefit of priority of the prior Japanese Patent Applications No. 2010-252839, filed on Nov. 11, 2010, the entire contents of which are incorporated herein by reference.

FIELD

The embodiments disclosed herein relate to a vector processing circuit, a command issuance control method and a processor system.

BACKGROUND

Vector processing circuits have been familiar as a circuit for performing computation processing of data. The vector processing circuits have generally been employed in supercomputers, and handle array-type data stored in a vector register file.

The vector processing circuits include multiple pipeline arithmetic units for performing desired computation processing according to a command, and perform multi-cycle operation at the pipeline arithmetic units. That is to say, the vector processing circuits process the array data to be processed for every multiple partial data across multiple cycles, and occupy the pipeline arithmetic units across multiple cycles until processing as to the entire array data is completed.

The size of array data, i.e., the number of array elements is specified by vector length (VL). The number of array elements specified by the vector length makes up one array register. The vector length is specified by a vector length register provided to within the vector processing circuit. The size of each array element is assigned according to data word length that the vector processing circuit handles. The data word length is specified by a command.

FIG. 1 is a diagram illustrating a configuration example of a vector register file for super computer. The vector register file 101 illustrated in FIG. 1 has a structure of one double word (doubleword)×256 entries, and the vector length is 16 (VL=16).

With the example illustrated in FIG. 1, one array element 102 stores 64-bit data. One array register 103 is made up of 16 array elements 102, and the vector register file 101 is made up of 16 array registers 103. Each of the array registers 103 stores array data 104. A physical number (0 to 255) is assigned to each of the array elements, and a logical number (0 to 15) is assigned to each of the array registers. Access to the vector register file 101 is performed by specifying the logical number of an array register, but further performed by generating the physical number of an array element based on the specified logical number and vector length.

Also, with the configuration example for super computer in FIG. 1, the sizes of array elements are assigned with the maximum data word length (e.g., 64 bits) that the vector processing circuit handles as a basic unit. In the event that the length of the data word length is a half (e.g., 32 bits), a method has been employed wherein the first half 32 bits alone are used at each of the array elements, and the second half 32 bits are unused. As illustrated in FIG. 1, for example, in the event of the vector processing circuit handling a double precision processing command, the data word length is 64 bits, and all of the 64 bits are used at each of the array elements, for example. On the other hand, in the event of handling a single precision processing command, the data word length is 32 bits, and accordingly, the first half 32 bits alone are used at each of the array elements.

Incidentally, with the vector processing circuits, at the time of command issuance, determination is made whether or not there is register interference between the preceding command and the subsequent command. This is because in the event that the array register specified by the preceding command, and the array register specified by the subsequent command overlap, in order to suitably reflect the processing results (array data) in the preceding command on the processing in the subsequent command, the issuance timing of the mutual commands has to be suitably adjusted.

Usually, array data to be processed at each of the pipeline arithmetic units may be distinguished the physical number (or logical number) alone of the head array element making up the corresponding array register. This is because the array data is made up of the same number of array elements, and multiple array elements making up the corresponding array register are processed as a single unit as to one command. For example, with the vector register file 101 illustrated in FIG. 1, distinction of the array data of each of the array registers (logical number 0 to 15) may be performed by the physical number (0, 16, 32, ..., 240) of the head array element of each of the array registers.

Therefore, when determining whether or not there is register interference between the preceding command and the subsequent command, it has been common to compare the physical number of the head array element of the array register specified by the preceding command, and the physical number of the head array element of the array register specified by the subsequent command.

Also, in the event that register interference has been detected between the preceding command and the subsequent command, a technique has been familiar wherein after delaying by a certain cycle until the processing results in the preceding command is written in the register file, the subsequent command is executed.

For example, refer to Japanese Laid-open Patent Publication No. 06-110686, Japanese Laid-open Patent Publication No. 10-124313, and Japanese Examined Patent Application Publication No. 07-086838.

Heretofore, the vector processing circuits have generally been used with a high-performance computing field such as super computers, but in recent years, it has been studied to apply the vector processing circuits to a signal processing system application field such as wireless baseband processing. In this case, the vector processing circuits are assumed to be used at a processor for a built-in device such as a DSP (Digital Signal Processor).

Also, with a field such as the above-mentioned wireless baseband processing, a case where commands having a different data word length are used by being mixed in a program frequently occurs, for example, such as a half word (Halfword) command of which the data word length is 16 bits, and a word (Word) command of which the data word length is 32 bits.

Even when the data word length differs between the preceding command and the subsequent command, determination has to be made regarding whether or not there is register interference. Therefore, it may be conceived to use the configuration example of the vector register file 101 for super computer illustrated in FIG. 1. In this case, event when commands having a different data word length are mixed, access to the vector register file is constantly performed with array registers having the same size as an access unit, and accordingly, determination regarding whether or not there is register interference may be executed by comparing the physical numbers alone of the head array elements of the array registers specified by commands regardless of difference in data word length.

However, in the event of executing a command of which the data word length is a half size (half word command), the second half portion of each of the array elements are not used, which substantially prevents a half region of the vector register file 101 from being used, and results in significant waste regarding used of the registers. This causes a major problem with a processor for a built-in device on which a register with limited capacity alone is mounted, and it is difficult to sufficiently expand the entire capacity of the vector register file.

On the other hand, in the event that commands having a different data word length are mixed, it may also be conceived to prevent a risk where register interference occurs by delaying issuance of the subsequent command so as to stall the subsequent command until the processing of the preceding command is completed without condition regardless of whether or not there is register interference.

However, in this case, pipeline processing is substantially not executed in parallel at the pipeline arithmetic units, and accordingly, it is unable to take advantage of the vector processing circuit, and efficiency in command execution deteriorates. This causes a major problem with a processor for a built-in device on which an arithmetic unit with limited processing capability alone is mounted, and it is difficult to sufficiently expand the processing capability of the pipeline arithmetic unit.

SUMMARY

According to an aspect of the embodiments, a vector processing circuit includes a vector register file including a plurality of array elements, a command issuance control circuit configured to issue commands including a preceding command and a subsequent command following the preceding command, and a plurality of pipeline arithmetic units, each of the pipeline arithmetic units being configured to perform, in response to one of the commands, arithmetic processing of data stored in the array elements indicated as a source by the one of the commands in parts through a plurality of cycles and to store the result of the arithmetic processing in the array elements indicated as a destination by the one of the commands in parts through a plurality of cycles. When the data word length of the preceding command is longer than the data word length of the subsequent command, the command issuance control circuit is configured to change data sizes of the array elements in accordance with data word length of the command and to determine whether there is register interference between at least one of the array elements to be processed at a non-head cycle of the preceding command, and the array element to be processed at a head cycle of the subsequent command and to adjust an issuance timing of the subsequent command on the basis of the determination result of the register interference.

The object and advantages of the embodiment will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram for describing register interference determination processing in the event that the data word length of the preceding command and the data word length of the subsequent command are the same.

FIG. 6 is a diagram for describing command issuance timing adjustment processing in the event that the data word length of the preceding command and the data word length of the subsequent command are the same.

FIG. 7 is a diagram for describing register interference determination processing in the event that the data word length of the preceding command is longer than the data word length of the subsequent command.

FIGS. 8A and 8B are diagrams for describing command issuance timing adjustment processing in the event that the data word length of the preceding command is longer than the data word length of the subsequent command.

FIGS. 9A and 9B are diagrams for describing command issuance timing adjustment processing in the event that the data word length of the preceding command is longer than the data word length of the subsequent command.

FIGS. 11A and 11B are diagrams illustrating an issuance determination value ID setting method.

DESCRIPTION OF EMBODIMENTS

Embodiments of the present invention will be described below.

1. First Embodiment

Figure 1:
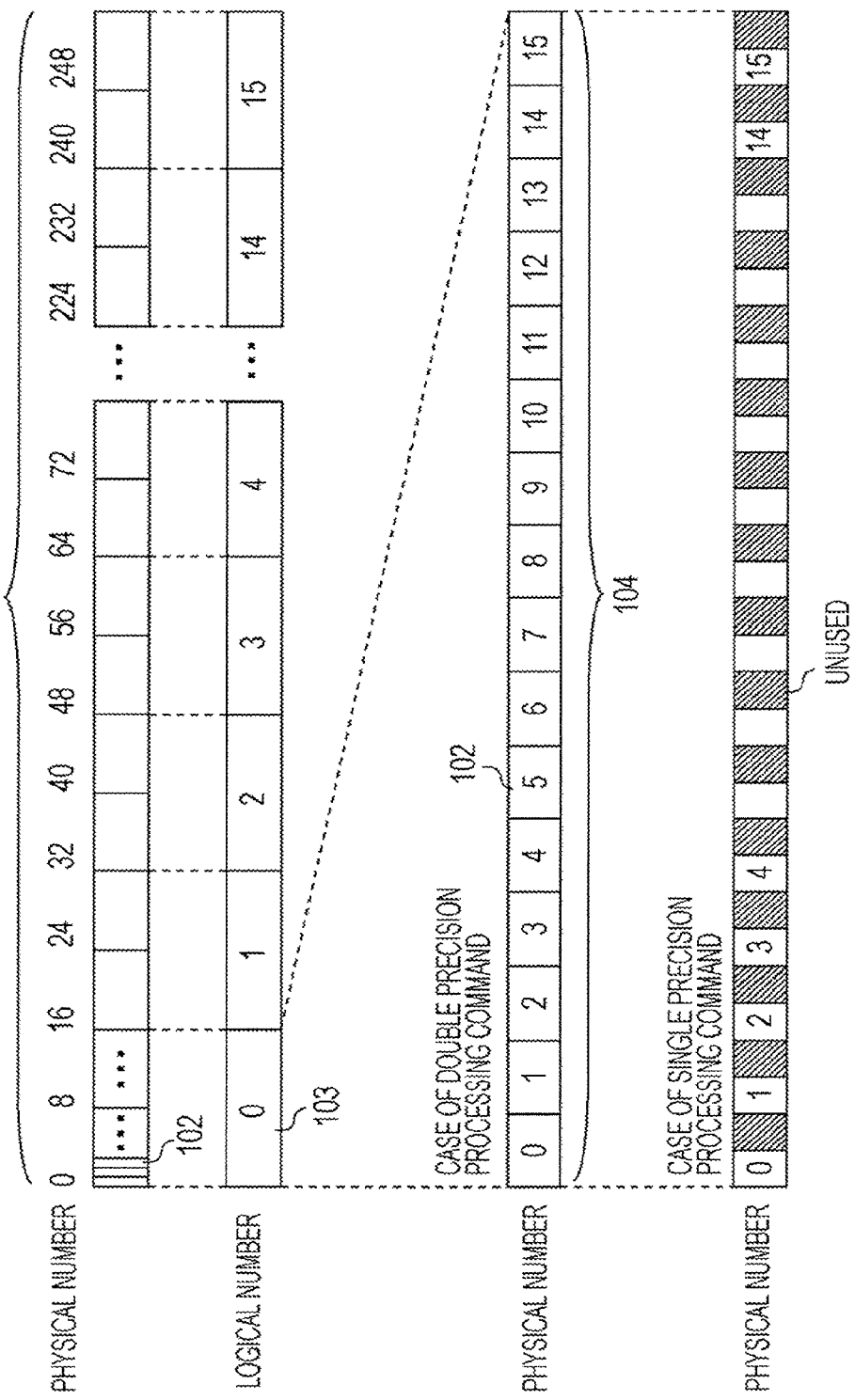
FIG. 1 is a diagram illustrating a configuration example of a vector register file for super computer.
Figure 2:
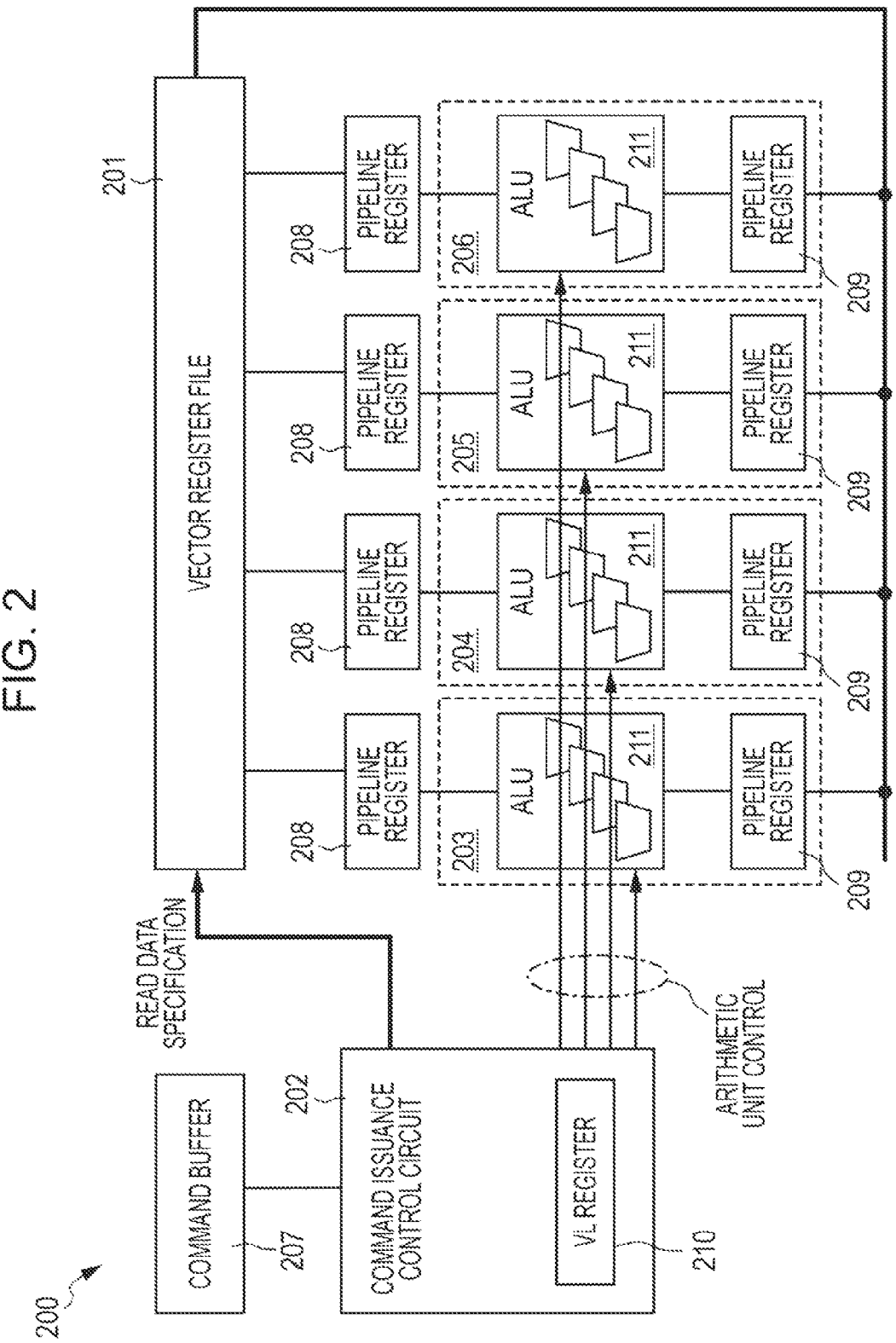
FIG. 2 is a diagram illustrating a configuration example of a vector processing circuit according to a first embodiment.

FIG. 2 is a diagram illustrating a configuration example of a vector processing circuit according to a first embodiment of the present invention. As illustrated in FIG. 2, a vector processing circuit 200 includes a vector register file 201, a command issuance control circuit 202, four pipeline arithmetic units 203 through 206, and a command buffer 207, and executes pipeline processing in accordance with later-described multiple pipeline stages.

[1-1. Configuration Example of Vector Processing Circuit]

First, the configuration example of the vector processing circuit 200 will be described with reference to FIG. 2.

The command buffer 207 stores a command that the vector processing circuit 200 executes. The command issuance control circuit 202 is connected to the command buffer 207, and receives a command from the command buffer 207. The command issuance control circuit 202 controls the operations of the vector register file 201 and the pipeline arithmetic units 203 through 206 based on the received command. The command issuance control circuit 202 determines whether or not there is register interference between the received command (subsequent command) and the command (preceding command) already having been executed, and adjusts the issuance timing of the subsequent command according to the determination result. Also, the command issuance control circuit 210 includes a VL register 210 for specifying vector length (VL).

The vector register file 201 stores data that the four pipeline arithmetic units 203 through 206 process. The vector register file 201 supplies the data to be processed to the pipeline arithmetic units 203 through 206 under the control of the command issuance control circuit 202. The details of the vector register file 201 will be described later.

A pipeline register 208 which stores data that each of the pipeline arithmetic units 203 through 206 processes is provided between the vector register file 201 and each of the pipeline arithmetic units 203 through 206. Each of the pipeline registers 208 receives data that the corresponding pipeline arithmetic unit processes from the vector register file 201.

Each of the pipeline arithmetic units 203 through 206 includes an arithmetic logic unit ALU 211, and each of the ALUs 211 includes four arithmetic units. Each of the arithmetic units is connected to the corresponding pipeline register 208, receives supply of data to be processed from the pipeline register 208, and executes desired calculation under the control of the command issuance control circuit 202. Here, the arithmetic units are 16-bit arithmetic units capable of calculating 16-bit data at the same time. Accordingly, one ALU may process four pieces of data at one cycle in the event of 16-bit data, and may process two pieces of data in the event of 32-bit data.

Each of the pipeline arithmetic units 203 through 206 includes a pipeline register 209 which stores the computation results of the ALU 211. The pipeline register 209 is connected to the vector register file 201. Each of the pipeline arithmetic units 203 through 206 writes back the computation results thereof to the vector register file 201 via the pipeline register 209.

[1-2. Configuration Example of Vector Register File 201]

Next, the details of the vector register file 201 will be described.

Figure 3:
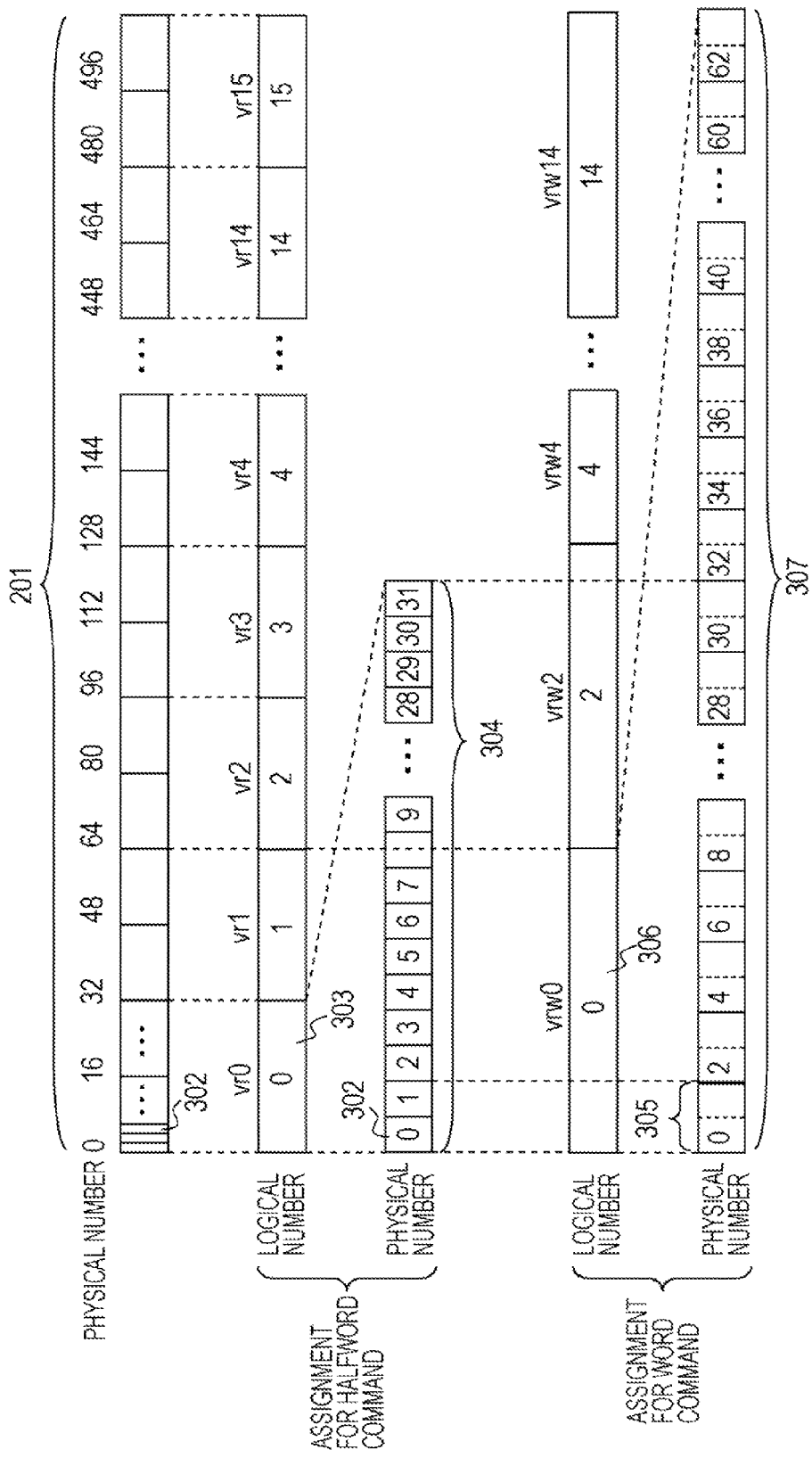
FIG. 3 is a diagram illustrating a configuration example of a vector register file.

FIG. 3 is a diagram illustrating a configuration example of the vector register file 201.

As described above, in the event of applying the vector processing circuit to a field such as wireless baseband processing, a case where commands having a different data word length are mixed between the preceding command and the subsequent command frequently occurs, for example, such as a half word command of which the data word length is 16 bits, and a word (Word) command of which the data word length is 32 bits, for example.

Therefore, with the vector register file 201, assignments of the logical number and physical number at the time of a half word command are determined, and also, assignments of the logical number and physical number at the time of a word command are determined.

[1-2-1. Assignment Example for Half Word Command]

First, an example of assignments of a logical number and a physical number at the time of a half word command will be described with reference to FIG. 3. The assignments of these logical number and physical number are managed by the command issuance control circuit 202.

The vector register file 201 illustrated in FIG. 3 has, for example, a configuration of one half word (Halfword)×512 entries, and the vector length is 32 (VL=32).

With the example illustrated in FIG. 3, one of array elements 302 stores 16-bit data. One array register 303 is made up of 32 array elements 302, and the vector register file 201 is made up of 16 array registers 303. Each of the array registers 303 stores array data 304.

The command issuance control circuit 202 assigns physical numbers 0 through 511 to the array elements 302, and assigns logical numbers 0 through 15 to the array registers 303. Access to the vector register file 201 is performed by a logical number of the array registers 303 being specified, but further, by the command issuance control circuit 202 generating a physical number of the array elements 302 based on the specified logical number and vector length.

Note that, with the example illustrated in FIG. 3, the pipeline arithmetic units 203 through 206 compute the data of four array elements 302 at one cycle. This is because, as described above, the ALU 211 of each of the pipeline arithmetic units 203 through 206 may process four pieces of 16-bit data at one cycle. One array register 303 is made up of 32 array elements 302, and accordingly, in order to execute computation processing as to all of the partial data of one array data 304, 8 (=32/4) cycles are needed. The ALU 211 of each of the pipeline arithmetic units 203 through 206 sequentially computes eight pieces of partial data made up of one array element 302 divided into four from a smaller physical number by diving into eight cycles.

[1-2-2. Assignment Example for Word Command]

Next, an example of assignments of a logical number and a physical number at the time of a word command will be described with reference to FIG. 3. Assignments of these logical number and physical number are managed by the command issuance control circuit 202.

The configuration of an array register and assignment of the corresponding logical number at the time of a word command differs from the configuration of an array register and assignment of the corresponding logical number at the time of a half word command, but these differences are taken advantage of.

At a word command, the command issuance control circuit 202 handles adjacent two array elements 302 made up of an array element having an even physical number A, and an array element having an odd physical number A+1 regarding a physical number assigned to a half word command, as one array element 305.

Also, the command issuance control circuit 202 handles adjacent two array registers 303 made up of an array register having an even logical number N, and an array register having an odd logical number N+1 regarding a logical number assigned to a half word command, as one array register 306. Array data 307 is stored in the array registers 306.

The command issuance control circuit 202 assigns the same physical number as the array element 302 having an even physical number of the corresponding two array elements 302, i.e., assigns even physical numbers 0, 2, 4, . . . , 508, and 510 alone to the array elements 305. The command issuance control circuit 202 assigns the same logical number as the array register 303 having an even logical number of the corresponding two array registers 303, i.e., assigns even logical numbers 0, 2, 4, . . . , 12, and 14 alone to the array registers 306. Access to the vector register file 201 is performed by specifying the logical number of an array register 306, but further performed by the command issuance control circuit 202 generating the physical number of an array element 305 based on the specified logical number and vector length.

Specifically, with the vector register file 201, a method will be employed wherein in the event that commands having a different data word length are mixed, the sizes and structures of the array elements and array registers are determined in accordance with the data word length of a command having a shorter data word length, and as to a command having a longer data word length, the multiple array elements and array registers determined as to the shorter data word length are combined according to the ratio between the longer data word length and the shorter data word length to virtually handle these as one array element and array register.

Thus, with the vector register file 201, even when commands having a different data word length are mixed, assignments of the array elements and array registers may be optimized according to each data word length, and accordingly, the number of unused array element bits in the vector register file may be eliminated.

Accordingly, with the vector register file 201 according to the first embodiment, even when commands having a different data word length are mixed, even when the vector register file 201 has limited register capacity alone, the commands having a different data word length may be processed while using those without waste.

Note that, with the example illustrated in FIG. 3, the pipeline arithmetic units 203 through 206 compute the data of two array elements 305 at one cycle. As described above, this is because the ALU 211 of each of the pipeline arithmetic units 203 through 206 may process two pieces of 32-bit data at one cycle. One array register 306 is made up of 32 array elements 305, and accordingly, in order to execute computation processing as to all of the partial data of one array data 307, 16 (=32/2) cycles are needed. The ALU 211 of each of the pipeline arithmetic units 203 through 206 sequentially computes 16 pieces of partial data made up of the array elements 305 divided into every two from a smaller physical number as to one array data 307 by being divided into 16 cycles.

[1-3. Pipeline Processing of Vector Processing Circuit 200]

Figure 4:
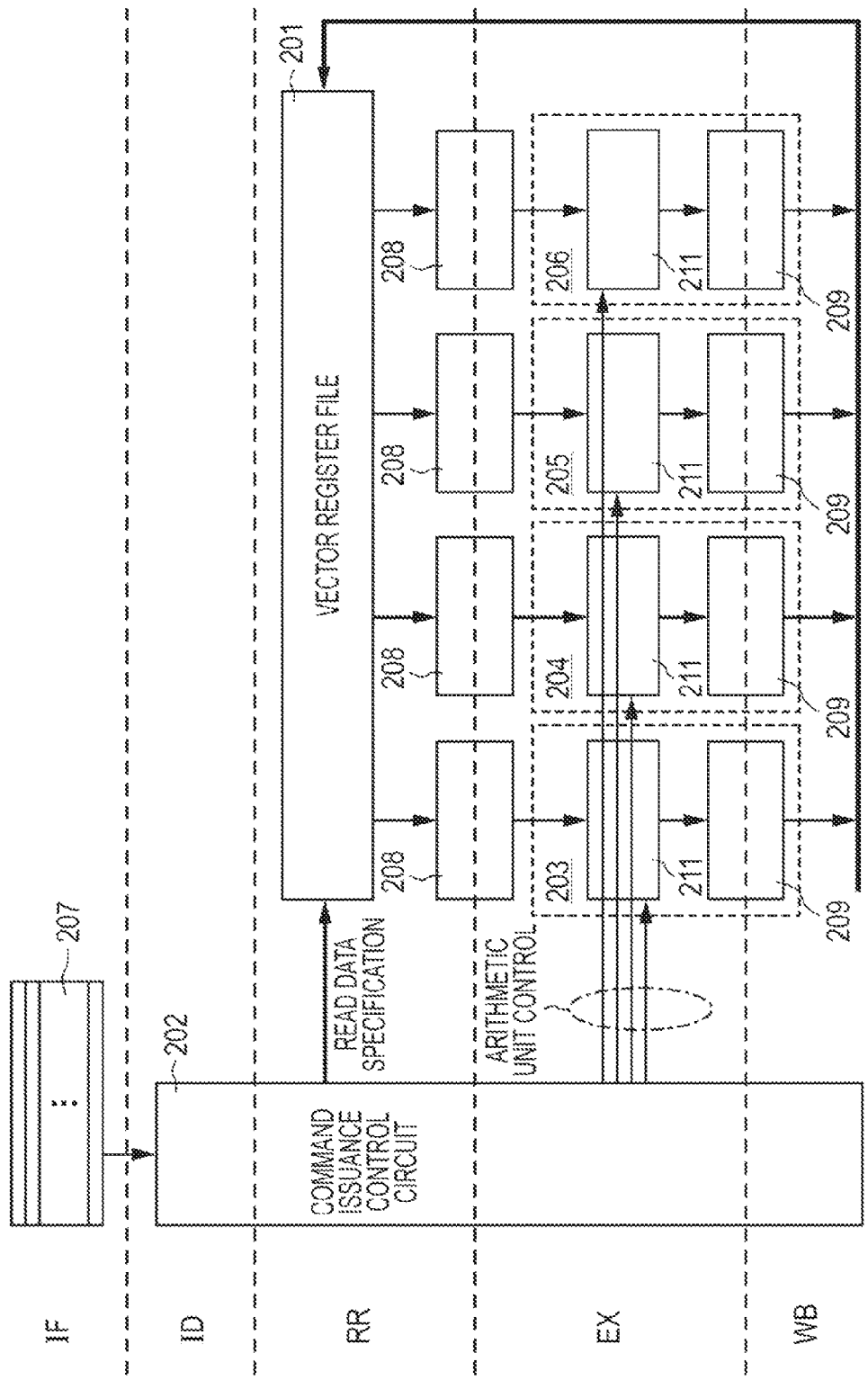
FIG. 4 is a diagram for describing pipeline processing of a vector processing circuit.

FIG. 4 is a diagram for describing the pipeline processing of the vector processing circuit 200. In FIG. 4, IF represents command fetch (Instruction Fetch), ID represents command decoding (Instruction Decode), RR represents register read (Register Read), EX represents command execution (Execution), and WB represents write back (Write Back). That is to say, the pipeline processing of the vector processing circuit 200 has five-stepped pipeline stages made up of IF, ID, RR, EX, and WB. The five-stepped pipeline stages are sequentially executed with continuous five cycles.

First, with the IF stage, the command buffer 207 receives a command to be processed from command memory (not illustrated) provided to the outside of the vector processing circuit 200. Here, the command includes a command code indicating the content of computation that the pipeline arithmetic units 203 through 206 process, source information indicating the logical number of the array register in which array data to be computed is stored, and destination information indicating the logical number of an array register which has to store computation results.

Next, with the ID stage, the command issuance control circuit 202 receives the command from the command buffer 207, and decodes the received command.

Next, with the RR stage, the command issuance control circuit 202 specifies the logical number of the array register in which the array data serving as a readout object is stored as to the vector register file 201 based on the source information obtained as a result of command decoding. The vector register file 201 selects, under the control of the command issuance control circuit 202, a desired array element in the array register corresponding to the specified logical number, and stores the data of the selected array element in the pipeline register 208 corresponding to the pipeline arithmetic unit where the command is executed.

Next, with the EX stage, the ALU 211 included in each of the pipeline arithmetic units 203 through 206 executes, under the control of the command issuance control circuit 202, computation according to the command code obtained as a result of decoding as to the data stored in the pipeline register 208. Each of the pipeline arithmetic units 203 through 206 stores the computation results in the corresponding pipeline register 209.

Next, with the WB stage, each of the pipeline arithmetic units 203 through 206 writes back the data of the computation results stored in the pipeline register 209 to the vector register file 201. At this time, the command issuance control circuit 202 specifies the logical number of the array register serving as a write-in object as to the vector register file 201 based on the destination information obtained as a result of command decoding. The data of the computation results stored in the pipeline register 209 is sequentially stored in the array register corresponding to the specified logical number at the vector register file 201.

The vector processing circuit 200 includes the four pipeline arithmetic units 203 through 206, and accordingly, pipeline processing having the above-mentioned five stepped pipeline stages may be executed in parallel at each of the pipeline arithmetic units 203 through 206. That is to say, the vector processing circuit 200 includes four execution pipelines.

Note that the five stepped pipeline stages have been employed in the above-mentioned pipeline processing, but the stage configuration of the pipeline processing is not restricted to this. For example, a memory access MA (Memory Access) stage may be provided between the EX stage and WB stage wherein reading or writing of data as to external memory (not illustrated) of the vector processing circuit 200 is performed. In the event of providing the MA stage, a pipeline register for storing the data of the processing results of the MA stage is additionally provided.

[1-4. Operation Example of Vector Processing Circuit when Data Word Length of Preceding Command and Data Word Length of Subsequent Command Match]

Here, first, register interference determination processing and command issuance timing adjustment processing will be described in the event that the data word length of the preceding command, and the data word length of the subsequent command are the same. Here, the vector register file 201 illustrated in FIG. 3 will be employed.

Note that, with the present Specification, the head array element of an array register means an array element to be processed at the head cycle of multiple processing cycles that each of the pipeline arithmetic units executes of multiple array elements making up the array register, and examples of this is an array element having the least physical number of multiple array elements making up an array register. A non-head array element means an array element to be processed at a non-head cycle of multiple processing cycles that each of the pipeline arithmetic units executes of multiple array elements making up the array register, and examples of this is an array element having the least physical number of array elements to be processed at a certain non-head cycle.

[1-4-1. Register Interference Determination Processing]

Hereafter, description will be made regarding an example of register interference determination processing in the event that the data word length of the preceding command, and the data word length of the subsequent command are the same.

FIG. 5 is a diagram for describing register interference determination processing in the event that the data word length of the preceding command, and the data word length of the subsequent command are the same. In FIG. 5, let us say that both of the preceding command and the subsequent command are half word commands, the destination of the preceding command is an array register vrN (N=0 to 15), and the source of the subsequent command is an array register vrM (M=0 to 15). Here, for example, vrN represents an array register 303 of which the logical number assigned to a half word command is N.

In this case, the physical number A of the head array element of the array register vrN may be obtained by multiplying the logical number N and the vector length VL, and the physical number B of the head array element of the array register vrM may be obtained by multiplying the logical number M and the vector length VL. Subsequently, in the event that these two physical numbers A and B match, the command issuance control circuit 202 determines that the two array registers vrN and vrM are mutually interfered.

The array data 304 stored in each of the array registers vrN and vrM may be distinguished by the physical numbers A and B alone of the head array elements making up the corresponding array register 303. This is because the array registers vrN and vrM are made up of the same number of array elements 302, these array elements are processed as a single object as to one command. Accordingly, the command issuance control circuit 202 may determine whether or not there is register interference between the preceding command and the subsequent command by comparing the physical number A of the head array element of the array register specified by the preceding command, and the physical number B of the head array element of the array register specified by the subsequent command.

Note that, with the example illustrated in FIG. 5, an example has been illustrated wherein determination is made whether or not there is register interference between the destination of the preceding command, and the source of the subsequent command, but a case where register interference determination is performed is not restricted to this. Register interference determination may also be made even between the destination of the preceding command, and the destination of the subsequent command. Also, register interference determination may also be made even between the destination of the subsequent command, and the source of the preceding command. This is because rewriting of the array data is performed as to the array register serving as a destination regardless of whether the command is the preceding command or subsequent command.

Note that, with the example illustrated in FIG. 5, an example has been illustrated wherein the head array element of the array register vrN specified by the preceding command, and the head array element of the array register vrM specified by the subsequent command are compared, but a combination of array elements serving as comparison objects is not restricted to this. Array elements may be taken as comparison objects as long as these are positioned in the corresponding positions between the array registers vrN and vrM. For example, with the array registers vrN and vrM, the corresponding array elements to be processed at the second through eighth non-head cycle may be taken as comparison objects.

[1-4-2. Command Issuance Timing Adjustment Processing]

FIG. 6 is a diagram illustrating an example of the command issuance timing adjustment processing in the event that the data word length of the preceding command, and the data word length of the subsequent command are the same. With the example illustrated in FIG. 6, the commands are all half word commands. Commands INST1 and INST2 are executed at two of the pipeline arithmetic units 203 through 206 in FIG. 2 under the control of the command issuance control circuit 202. Commands INST3 and INST4 are also executed in the same way.

With the example illustrated in FIG. 6, an addition command (vaddh) is issued as the preceding half word command INST1, vr0 and vr2 are specified as sources thereof, and vr4 is specified as a destination thereof. Specifically, the command issuance control circuit 202 issues a command for adding (vaddh) the array data 304 of the array register vr0 of the logical number 0, and the array data 304 of the array register vr2 of the logical number 2 in the vector register file 201 illustrated in FIG. 3, and storing the data of the addition results in the array register vr4 of the logical number 4.

As described above, with the ALU 211 of each of the pipeline arithmetic units 203 through 206, eight cycles are needed to execute processing as to all of the partial data of one array data 304. Accordingly, the addition computation of the command INST1 is executed in order from the head array elements of the array registers vr0 and vr2 serving as sources by being divided into eight cycles. FIG. 6 illustrates a scene where the addition computation of the command INST1 is executed across eight cycles in total of cycles 1 through 8. This may also be applied to the commands INST2 through INST4.

Also, a multiplication command (vmulh) is issued as the subsequent half word command INST2, vr4 and vr2 are specified as sources thereof, and vr6 is specified as a destination thereof. Specifically, the command issuance control circuit 202 issues a command for multiplying (vmulh) the array data 304 of the array register vr4 of the logical number 4, and the array data 304 of the array register vr2 of the logical number 2 in the vector register file 201 illustrated in FIG. 3, and storing the data of the multiplication results in the array register vr6 of the logical number 6.

With the example illustrated in FIG. 6, the array register vr4 is specified as the destination of the preceding command INST1, and also specified as the source of the subsequent command INST2. In this case, the physical number A of the head array element of the destination of the preceding command INST1, and the physical number B of the head array element of the source of the subsequent command INST2 are both 128 (logical number 4×vector length 32), and mutually match. Accordingly, determination is made by the command issuance control circuit 202 that there is register interference between the preceding command INST1 and the subsequent command INST2 at the array register vr4.

Here, as described above in FIG. 4, with the pipeline arithmetic units 203 through 206, the processing in the WB stage has to be executed to write back the data computed by the ALU 211 on the EX stage to the vector register file 201. In addition, further one cycle (RR stage) is needed to read out the data to be computed from the vector register file 201 before the EX stage. Specifically, the pipeline arithmetic units 203 through 206 has to have at least three cycles (RR stage, EX stage, and WB stage) to execute processing as to one partial data of the array data 304. Accordingly, it is at least a cycle after three cycles of the cycle where the RR stage of the preceding command INST1 is executed to take advantage of the computation results of the preceding command INST1 with the subsequent command INST2.

Accordingly, with the example illustrated in FIG. 6, the command issuance control circuit 202 adjusts the issuance timing of the subsequent command INST2 so that the processing (RR stage) of the subsequent command INST2 starts at cycle 4 that is a cycle after three cycles of cycle 1 that is the head cycle (RR stage) of the preceding command INST1.

Specifically, in the event that there is register interference between the preceding command and the subsequent command, the command issuance control circuit 202 performs issuance timing adjustment processing for inserting a penalty cycle PC1 according to the preceding command as to the subsequent command. The number of penalty cycles PC1 is set according to the type of the preceding command. For example, in the event of the above-mentioned addition command, further two cycles (EX stage and WB stage) are needed until the WB stage ends since the head cycle (RR stage) of the command, and accordingly, the number of penalty cycles is 2 (PC1=2).

On the other hand, the array register vr8 specified as the destination of the preceding command is not specified as the source of the subsequent command between the preceding command INST3 and the subsequent command INST4. In this case, the physical number A of the head array element of the destination of the preceding command INST3=256 (logical number 8×vector length 32), and the physical numbers B of the two head array elements of the source of the subsequent command INST4=320 (logical number 10×vector length 32) and 192 (logical number 6×vector length 32) do not match each other. Accordingly, determination is made by the command issuance control circuit 202 that there is no register interference.

Accordingly, in this case, the command issuance control circuit 202 adjusts the issuance timing of the subsequent command INST4 so that the subsequent command INST4 starts at the next cycle (cycle 2) of cycle 1 that is the head cycle of the preceding command INST3. That is to say, the command issuance control circuit 202 inserts no penalty cycle.

[1-5. Operation Example of Vector Processing Circuit when Data Word Length of Preceding Command is Longer than Data Word Length of Subsequent Command]

Next, description will be made regarding the register interference determination processing and the command issuance timing adjustment processing in the event that the data word length of the preceding command is longer than the data word length of the subsequent command. Here, the vector register file 201 illustrated in FIG. 3 will be employed.

[1-5-1. Register Interference Determination Processing]

Hereafter, description will be made regarding an example of the register interference determination processing in the event that the data word length of the preceding command is longer than the data word length of the subsequent command.

FIG. 7 is a diagram for describing the register interference determination processing in the event that the data word length of the preceding command is longer than the data word length of the subsequent command. In FIG. 7, let us say that the preceding command is a word command, the subsequent command is a half word command, the destination of the preceding word command is an array register vrwN (N=0, 2, . . . , 14), and the source of the subsequent command is an array register vrM (M=0 to 15). Now, for example, vrwN represents the array register 306 of which the logical number assigned to the word command is N (N is an even number), and vrM represents the array register 303 of which the logical number assigned to the half word command is M.

Here, as describe above, one array register 306 to be accessed with a word command is made up of two array registers 303 to be accessed at the time of a half word command. Specifically, the array register vrwN to be accessed with the preceding word command is made up of the array register vrN and array register vrN+1, which may be an access object with a half word command.

Accordingly, with regard to the array register vrM to be accessed with the subsequent half word command, determination regarding whether or not there is register interference has to be made as to both of the first half array register vrN and the second half array register vrN+1. That is to say, in this case, there are two register interference modes of a mode where the first half array register of the preceding word command interferes, and a mode where the second half array register interferes.

However, whether or not there is register interference between the above-mentioned preceding word command and subsequent half word command may not accurately be determined by simply employing the register interference determination processing in the event that the data word lengths are the same. Specifically, whether or not there is register interference between the above-mentioned preceding word command and subsequent half word command may not accurately be determined by simply comparing the physical number of the head array element 305 of the array register 306 specified by the preceding word command, and the physical number of the head array element 302 of the array register 303 specified by the subsequent half word command.

The reason thereof will be described below. The physical number A1 of the head array element 305 of the array register vrwN, and the physical number of the head array element 302 of the array register vrN are the same. Accordingly, the command issuance control circuit 202 may determine whether or not there is register interference regarding the first half array register vrN relating to the preceding word command, and the array register vrM relating to the subsequent half word command by comparing the physical number A1 of the head array element 305 of the array register vrwN, and the physical number B of the head array element 302 of the array register vrM.

However, with the above-mentioned determination processing, the second half array register vrN+1 is not taken into consideration at all, and accordingly, the register interference with the array register vrM is not determined by the command issuance control circuit 202. Accordingly, the array register vrN+1 relating to the preceding word command may have interference with the array register vrM relating to the subsequent half word command.

Therefore, with the example illustrated in FIG. 7, the command issuance control circuit 202 also performs comparison between the physical number A2 of the head array element of the array register vrN+1, and the physical number B of the head array element of the array register vrM specified by the subsequent half word command. The array element having the physical number B is processed at the head cycle of the subsequent half word command, and on the other hand, the array element having the physical number A2 is processed at the ninth cycle of the preceding word command since it takes eight cycles to execute computation processing as to all of the array elements of the array register vrN.

According to this comparison, the command issuance control circuit 202 also determines whether or not there is register interference regarding the array register vrN+1 relating to the preceding word command, and the array register vrM relating to the subsequent half word command. Specifically, the command issuance control circuit 202 determines whether or not there is register interference by comparing the physical number A2 of a non-head array element, and the physical number B of the head array element of the array register vrM in addition to the physical number A1 of the head array element of the array register vrwN.

In this case, the physical number A1 of the head array element of the array register vrwN may be obtained by multiplying the logical number N and vector length VL, and the physical number A2 of a non-head array element may be obtained by multiplying the logical number N and vector length VL, and further adding the vector length VL. The physical number B of the head array element of the array register vrM may be obtained by multiplying the logical number M and vector length VL. Subsequently, in the event that the physical numbers A1 and B match, the command issuance control circuit 202 determines that the array registers vrwN and vrM interfere each other regarding the first half array register vrN, and in the event that the physical numbers A2 and B match, determines that the array registers vrwN and vrM interfere each other regarding the second half array register vrN+1.

Thus, with the vector processing circuit 200 according to the first embodiment, even when the data word length of the preceding command is longer than the data word length of the subsequent command, determination of register interference may suitably be performed between the array register specified by the preceding command and the array register specified by the subsequent command according to multiple register interference modes, and whether or not there is register interference may be accurately be detected.

Here, with the above-mentioned register interference determination, the positions or number of non-head array elements to be compared are changed depending on the configuration of the vector register file 201, data word length, or the like. With the example illustrated in FIG. 7, the preceding command is a word command, the subsequent command is a half word command, and the data word length of the word command has double length of the data word length of the half word command, it is sufficient to take the array element alone positioned in the middle of the array register vrwN (the head array element of the array register vrN+1 alone) as a comparison object in addition to the array element positioned in the head of the array register vrwN (the head array element of the array register vrN).

On the other hand, for example, in the event that the preceding command is a double word command, and the subsequent command is a half word command, the data word length of the double word command has quadruple length of the data word length of the half word command, and adjacent four array elements as to the subsequent half word command are handled as a single array element. In this case, the array register specified by the preceding double word command includes four array registers which may be access objects with the subsequent half word command. Accordingly, not only an array element positioned in the middle (½) of the array register specified by the preceding double word command but also array elements positioned in ¼ and ¾ of the entire array register have to be taken as comparison objects. That is to say, with the array register specified by the preceding double word command, array elements to be processed at three cycles corresponding to one time, double, and triple of the number of cycles necessary for executing the computation processing as to the array register specified by the subsequent half word command, will also be taken as comparison objects.

Note that, with the example illustrated in FIG. 7, an example has been illustrated wherein whether or not there is register interference is determined between the destination of the preceding command, and the source of the subsequent command, but a case where determination of register interference is performed is not restricted to this. Determination of register interference may be performed even between the destination of the preceding command and the destination of the subsequent command. Also, determination of register interference may be performed even between the destination of the subsequent command and the source of the preceding command. This is because rewriting of the array data is performed as to the array register serving as a destination regardless of whether the command is the preceding command or subsequent command.

Note that, with the example illustrated in FIG. 7, an example has been illustrated wherein the head array element of the array register vrN+1 specified by the preceding command, and the head array element of the array register vrM specified by the subsequent command are compared, but a combination of array elements serving as comparison objects is not restricted to this. Array elements may be taken as comparison objects as long as these are positioned in the corresponding positions between the array registers vrN+1 and vrM. For example, with the array registers vrN+1 and vrM, the corresponding array elements to be processed at the second through eighth non-head cycle may be taken as comparison objects.

[1-5-2. Command Issuance Timing Adjustment Processing]

FIGS. 8A, 8B, 9A, and 9B are diagrams illustrating an example of the command issuance timing adjustment processing in the event that the data word length of the preceding command is longer than the data word length of the subsequent command.

First, FIG. 8A illustrates an example wherein register interference occurs at the first half array register of the preceding word command between the preceding word command and the subsequent half word command.

With the example illustrated in FIG. 8A, while the preceding command is a word command, the subsequent command is a half word command. The commands INST1 and INST2 are executed at two of the pipeline arithmetic units 203 through 206 in FIG. 2 under the control of the command issuance control circuit 202. This is also true regarding the commands INST3 and INST4, INST5 and INST6, and INST7 and INST8.

With the example illustrated in FIG. 8A, an addition command (vadd) that is a word command is issued as the preceding word command INST1, vrw0 and vrw2 are specified as sources thereof, and vrw4 is specified as a destination thereof. Specifically, the command issuance control circuit 202 issues a command for adding (vadd) the array data 307 of the array register vrw0 of the logical number 0, and the array data 307 of the array register vrw2 of the logical number 2 in the vector register file 201 illustrated in FIG. 3, and storing the data of the addition results in the array register vrw4 of the logical number 4.

As described above, with the ALU 211 of each of the pipeline arithmetic units 203 through 206, in order to execute computation processing as to all of the partial data of one array data 307, 16 cycles are needed. Therefore, the addition computation of the command INST1 is executed in order from the head array element of each of the array registers vrw0 and vrw2 serving as sources by being divided into 16 cycles. FIGS. 8A and 8B illustrate a scene where the addition computation of the command INST1 is executed across 16 cycles in total of cycles 1 through 16. This may also be applied to the commands INST3, INST5, and INST7.

Further, one array register 306 to be accessed with a word command is made up of two array registers 303 to be accessed at the time of a half word command. Therefore, as the command INST1, with the first half eight cycles, the array data 304 of the array register vr0 of the logical number 0, and the array data 304 of the array register vr2 of the logical number 2 are added, the data of the addition results is stored in the array register vr4 of the logical number 4, and also with the second half eight cycles, the array data 304 of the array register vr1 of the logical number 1, and the array data 304 of the array register vr3 of the logical number 3 are added, and the data of the addition results is stored in the array register vr5 of the logical number 5.

Also, as the subsequent half word command INST2, an addition command (vaddh) that is a half word command is issued, vr4 and vr10 are specified as sources thereof, and vr11 is specified as a destination thereof. Specifically, the command issuance control circuit 202 issues a command for adding (vaddh) the array data 304 of the array register vr4 of the logical number 4, and the array data 304 of the array register vr10 of the logical number 10 in the vector register file 201 illustrated in FIG. 3, and storing the data of the addition results in the array register vr11 of the logical number 11.

Execution of the command INST2 is performed in the same way as the command INST1 in FIG. 6. FIG. 8A illustrates a scene where the addition computation of the command INST2 is executed across eight cycles in total of cycles 3 to 10. This is true regarding the command INST4, INST6, and INST8.

With the example illustrated in FIG. 8A, the first half array register vr4 making up the array register vrw4 specified as the destination of the preceding word command is also specified as the source of the subsequent half word command INST2. In this case, the physical number A1 of the head array element 305 of the destination of the preceding command INST1, and the physical number B of the head array element 302 of the source of the subsequent command INST2 are both 128 (logical number 4×vector length 32), and match each other. Accordingly, the command issuance control circuit 202 determines that there is register interference between the preceding command INST1 and the subsequent command INST2 in the first half array register vr4.

On the other hand, the second half array register vr5 making up the array register vrw4 is not specified as the source of the subsequent half word command. In this case, the physical number A2 of the array element 305 in the middle of the destination of the preceding command INST1=160 (logical number 5×vector length 32), and the physical number B of the head array element 302 of the source of the subsequent command INST2=128 (logical number 4×vector length 32), 320 (logical number 10×vector length 32) do not match each other. Accordingly, the command issuance control circuit 202 determines that there is no register interference in the second half array register vr5.

Consequently, the first half array register vr4 interferes, and accordingly, with the example illustrated in FIG. 8A, the command issuance control circuit 202 adjusts the issuance timing of the subsequent command INST2 so that the processing of the subsequent half word command INST2 (RR stage) starts at cycle 4 positioned after three cycles of cycle 1 that is the processing start cycle as to the first half array register vr4 of the preceding word command INST1 (RR stage, the head cycle of the preceding word command INST1). Here, the reason why the subsequent command is delayed by three cycles is the same as with the case illustrated in FIG. 6.

Specifically, in the event that there is register interference between the first half array register of the preceding word command and the array register of the subsequent half word command, the command issuance control circuit 202 performs issuance timing adjustment processing for inserting a penalty cycle PC1 according to the preceding word command as to the subsequent half word command. The number of penalty cycles PC1 is set according to the type of the preceding command. For example, in the event of the above-mentioned addition command, further two cycles (EX stage and WB stage) are needed since the head cycle (RR stage) of the command until end of the WB stage, the number of penalty cycles PC1 is 2 (PC1=2).

Here, as a comparative example, FIG. 9B illustrates an example wherein in the event that the data word length of the preceding command is longer than the data word length of the subsequent command, the command issuance timing adjustment processing according to the related art has been applied. As illustrated in FIG. 9B, in the event of applying the command issuance timing adjustment processing according to the related art, the command issuance control circuit 202 delays the issuance of the subsequent command INST8 so that the subsequent half word command INST8 is stalled until the processing of the preceding word command INST7 is completed without conditions regardless of whether or not there is register interference. Consequently, the processing of the subsequent half word command INST8 starts from cycle 17.

Consequently, with the example illustrated in FIG. 8A, the head cycle (processing start cycle) of the subsequent half word command may be accelerated by 13 cycles as compared to the comparative example by employing the register interference determination processing and subsequent command issuance timing adjustment processing according to the first embodiment. Accordingly, even when the data word length of the preceding command is longer than the data word length of the subsequent command, efficiency in command issuance may be realized by suitably performing determination of register interference to accurately detect whether or not there is register interference.

Next, FIG. 8B illustrate an example wherein register interference occurs in the second half array register of the preceding word command between the preceding word command and the subsequent half word command.

With the example illustrated in FIG. 8B, the addition command (vadd) that is a word command is issued as the preceding word command INST3, vrw0 and vrw2 are specified as sources thereof, and vrw4 is specified as a destination thereof. Specifically, the command issuance control circuit 202 issues a command for adding (vadd) the array data 307 of the array register vrw0 of the logical number 0, and the array data 307 of the array register vrw2 of the logical number 2 in the vector register file 201 illustrated in FIG. 3, and storing the data of the addition results in the array register vrw4 of the logical number 4.

The command INST3 adds, with the first half eight cycles, the array data 304 of the array register vr0 of the logical number 0, and the array data 304 of the array register vr2 of the logical number 2, and stores the data of the addition results in the array register vr4 of the logical number 4, and also with the second half eight cycles, adds the array data 304 of the array register vr1 of the logical number 1, and the array data 304 of the array register vr3 of the logical number 3, and stores the data of the addition results in the array register vr5 of the logical number 5.

Also, as the subsequent half word command INST4, the addition command (vaddh) that is a half word command is issued, vr5 and vr10 are specified as sources thereof, and vr11 is specified as a destination thereof. Specifically, the command issuance control circuit 202 issues a command for adding (vaddh) the array data 304 of the array register vr5 of the local number 5, and the array data 304 of the array register vr10 of the logical number 10 in the vector register file 201 illustrated in FIG. 3, and storing the data of the addition results in the array register vr11 of the logical number 11.

With the example illustrated in FIG. 8B, the first half array register vr4 making up the array register vrw4 specified as the destination of the preceding word command is not specified as the source of the subsequent half word command. In this case, the physical number A1 of the head array element 305 of the destination of the preceding command INST3=128 (logical number 4×vector length 32), and the physical number B of the head array element 302 of the source of the subsequent command INST4=128 (logical number 4×vector length 32), 320 (logical number 10×vector length 32) do not match each other. Accordingly, the command issuance control circuit 202 determines that there is no register interference in the first half array register vr5.

On the other hand, the second half array register vr5 making up the array register vrw4 is also specified as the source of the subsequent half word command INST4. In this case, the physical number A2 of the array element 305 in the middle of the destination of the preceding command INST3, and the physical number B of the head array element 302 of the source of the subsequent command INST4 are both 160 (=logical number 5×vector length 32), and match each other. Accordingly, the command issuance control circuit 202 determines that there is register interference between the preceding command INST1 and the subsequent command INST2 at the second half array register vr5.

Consequently, the second half array register vr5 of the preceding word command interferes, and accordingly, with the example illustrated in FIG. 8B, the command issuance control circuit 202 adjusts the issuance timing of the subsequent command INST4 so that the processing of the subsequent half word command INST4 (RR stage) starts at cycle 12 positioned after three cycles of cycle 9 that is the processing start cycle as to the second half array register vr5 of the preceding word command INST1 (RR stage, a non-head cycle of the preceding word command INST1). Here, the reason why the subsequent command is delayed by three cycles is the same as with the case illustrated in FIG. 6.

Specifically, in the event that there is register interference between the second half array register of the preceding word command and the array register of the subsequent half word command, the command issuance control circuit 202 performs issuance timing adjustment processing for inserting penalty cycles PC obtained by adding a penalty cycle PC2 according to the number of cycles from the processing start cycle (the head cycle of the preceding word command) as to the first half array register vr4 of the preceding word command to the processing start cycle (a non-head cycle of the preceding word command) as to the second half array register vr5 to a penalty cycle PC1 according to the preceding word command, to the subsequent half word command (PC=PC1+PC2).

The number of penalty cycles PC1 is set according to the type of the preceding command. For example, in the event of the above-mentioned addition command, further two cycles (EX stage and WB stage) are needed from the head cycle (RR stage) of the command to end of the WB stage, and accordingly, the number of penalty cycles PC1 is 2 (PC1=2).

Also, the number of penalty cycles PC2 is the number of cycles necessary for processing the array data 304 of the first half array register of the preceding word command at the ALU 211 of each of the pipeline arithmetic units 203 through 206, which is determined depending on the number of array elements 302 that the ALU 211 may compute in one cycle. If we say that the vector length is VL, and the arithmetic unit parallelism of the pipeline arithmetic units 203 through 206 (the number of arithmetic units which the ALU 211 includes) is PA, the number of penalty cycle PC2 is obtained by dividing VL by PA (PC2=VL/PA). For example, with the example illustrated in FIG. 8B, the vector length is 32 (VL=32), and the arithmetic unit parallelism is 4 (PA=4), and accordingly, the number of penalty cycles PC2 is 8 (PC2=8).

Here, as described above, with the comparative example illustrated in FIG. 9B, the subsequent half word command starts from cycle 17.

Consequently, with the example illustrated in FIG. 8B, the head cycle (processing start cycle) of the subsequent half word command may be accelerated by 5 cycles as compared to the comparative example by employing the register interference determination processing and subsequent command issuance timing adjustment processing according to the first embodiment. Accordingly, even when the data word length of the preceding command is longer than the data word length of the subsequent command, efficiency in command issuance may be realized by suitably performing determination of register interference to accurately detect whether or not there is register interference.

Next, FIG. 9A illustrate an example wherein no register interference occurs between the preceding word command and the subsequent half word command.

With the example illustrated in FIG. 9A, the addition command (vadd) that is a word command is issued as the preceding word command INST5, vrw0 and vrw2 are specified as sources thereof, and vrw4 is specified as a destination thereof. Specifically, the command issuance control circuit 202 issues a command for adding (vadd) the array data 307 of the array register vrw0 of the logical number 0, and the array data 307 of the array register vrw2 of the logical number 2 in the vector register file 201 illustrated in FIG. 3, and storing the data of the addition results in the array register vrw4 of the logical number 4.

Also, as the subsequent half word command INST6, the addition command (vaddh) that is a half word command is issued, vr6 and vr10 are specified as sources thereof, and vr11 is specified as a destination thereof. Specifically, the command issuance control circuit 202 issues a command for adding (vaddh) the array data 304 of the array register vr6 of the local number 6, and the array data 304 of the array register vr10 of the logical number 10 in the vector register file 201 illustrated in FIG. 3, and storing the data of the addition results in the array register vr11 of the logical number 11.

With the example illustrated in FIG. 9A, the array register vrw4 specified as the destination of the preceding word command is configured of the first half array register vr4 and the second half array register vr5, but the array registers vr4 and vr5 are not specified as the sources of the subsequent half word command. In this case, the physical number A1 of the head array element 305 of the destination of the preceding command INST5=128 (logical number 4×vector length 32), and the physical number B of the head array element 302 of the source of the subsequent command INST4=192 (logical number 6×vector length 32), 320 (logical number 10×vector length 32) do not match each other. Accordingly, the command issuance control circuit 202 determines that there is no register interference.

Accordingly, in this case, the command issuance control circuit 202 adjusts the issuance timing of the subsequent command INST6 so that the processing (RR stage) of the subsequent half word command INST6 starts at the next cycle of cycle 1 (cycle 2) that is the head cycle (RR stage) of the preceding command INST5. That is to say, the command issuance control circuit 202 inserts no penalty cycle.

Now, as described above, with the comparative example illustrated in FIG. 9B, the subsequent half word command starts from cycle 17.

Accordingly, with the example illustrated in FIG. 9A, the start cycle of the subsequent half word command may be accelerated by 15 cycles as compared to the comparative example by employing the register interference determination processing and subsequent command issuance timing adjustment processing according to the first embodiment. Accordingly, even when the data word length of the preceding command is longer than the data word length of the subsequent command, efficiency in command issuance may be realized by suitably performing determination of register interference to accurately detect whether or not there is register interference.

As described above, with the vector processing circuit 200 according to the first embodiment, even when the data word length of the preceding command is longer than the data word length of the subsequent command, according to multiple register interference modes, determination of register interference may suitably be performed between the array register specified by the preceding command and the array register specified by the subsequent command, whether or not there is register interference may accurately be detected, and the issuance timing of the subsequent command may suitably be adjusted based on the accurate detection result. Accordingly, even when commands having a different word length are mixed, efficiency in command issuance may be realized.

[1-6. Processing of Command Issuance Control Circuit 202]

The above-mentioned register interference determination processing and subsequent command issuance timing adjustment processing are executed by the command issuance control circuit 202. After receiving the subsequent command from the command buffer 207, the command issuance control circuit 202 performs determination of register interference as to all of the preceding commands being executed at the pipeline arithmetic units 203 through 206 regarding the subsequent command thereof. Based on the determination results thereof, the command issuance control circuit 202 adjusts the issuance timing of the subsequent command.

Figure 10:
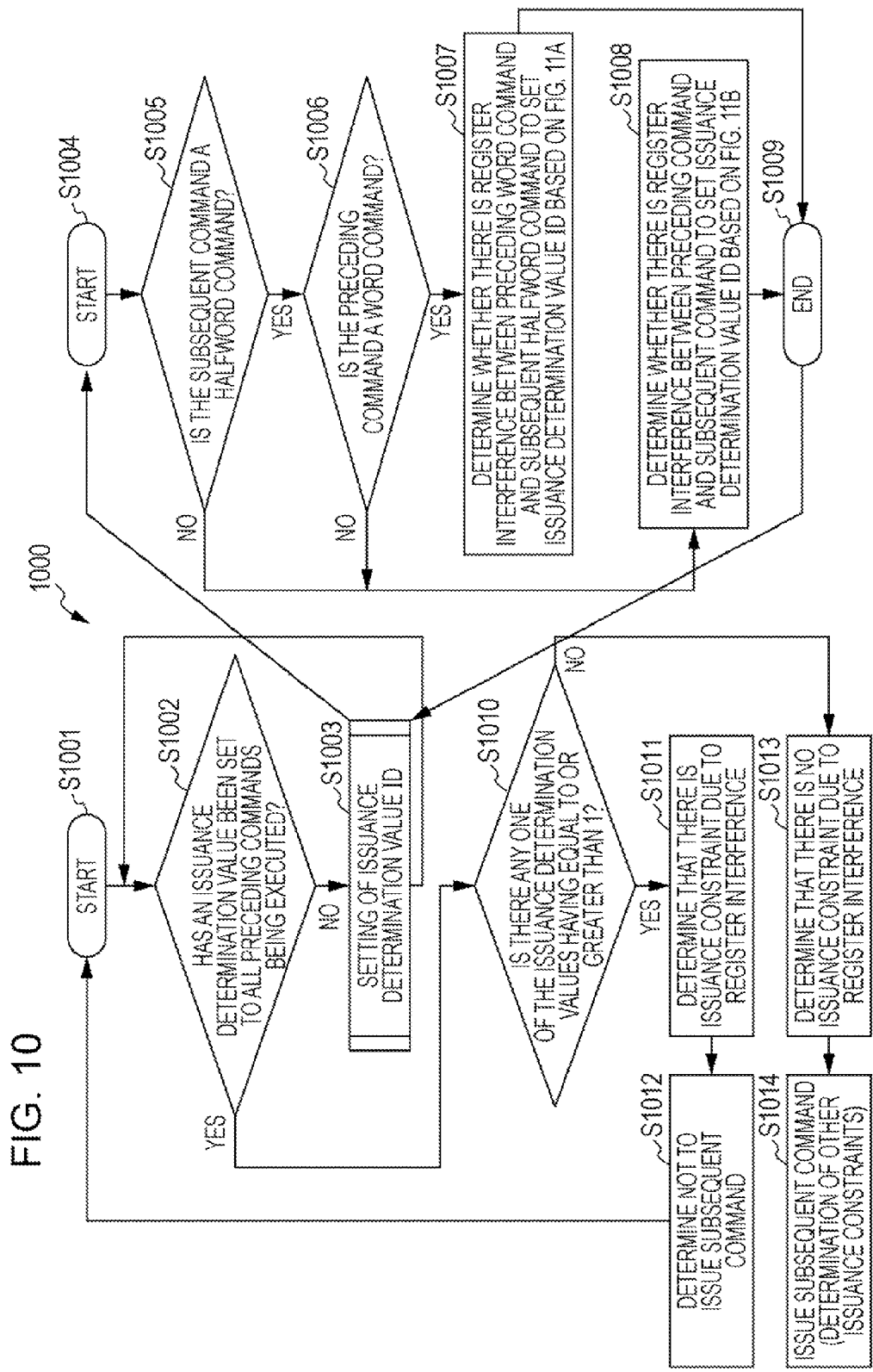
FIG. 10 is a diagram illustrating a processing flow of a command issuance control circuit.

FIG. 10 is a diagram illustrating a processing flow 1000 of the command issuance control circuit 202 according to the first embodiment. In FIG. 10, let us say that a word command and a half word command which differ in data word length are mixed in commands to be issued. A series of processing made up of S1001 through S1014 illustrated in FIG. 10 will be executed at the command issuance control circuit 202 for each processing cycle.

First, in step S1001, the command issuance control circuit 202 receives the subsequent command, and starts the series of processing.

Next, in step S1002, the command issuance control circuit 202 determines whether or not an issuance determination value ID has been set to all of the preceding commands being executed at the pipeline arithmetic units 203 through 206. In the event that settings of an issuance determination value ID have been completed as to all of the preceding commands being executed, the processing of the command issuance control circuit 202 proceeds to step S1010. In the event of incompletion, the command issuance control circuit 202 determines a preceding command serving as an object to which an issuance determination value ID will be set, and the processing thereof proceeds to step S1003.

In step S1003, the command issuance control circuit 202 executes issuance determination value ID setting processing as to the preceding command to be processed. In step S1003, in the event that there are multiple preceding commands being executed, the same number of issuance setting values as the preceding commands are set. The processing in step S1003 is made up of processing in steps S1004 through S1009.

First, in step S1004, the command issuance control circuit 202 starts issuance determination value ID setting processing.

Next, in step S1005, the command issuance control circuit 202 determines whether or not the subsequent command is a half word command. In the event that the subsequent command is a half word command, the command issuance control circuit 202 proceeds to step S1006. Otherwise, the command issuance control circuit 202 proceeds to step S1008.

Next, in step S1006, the command issuance control circuit 202 determines whether or not the preceding command to be processed is a word command. In the event that the preceding command to be processed is a word command, the command issuance control circuit 202 proceeds to step S1007. Otherwise, the command issuance control circuit 202 proceeds to step S1008.

Next, in step S1007, the command issuance control circuit 202 performs determination of register interference between the preceding word command and the subsequent half word command. Here, as described in FIG. 7, with regard to the array register vrM to be accessed by the subsequent half word command, the command issuance control circuit 202 determines whether or not there is register interference as to both of the first half array register vrN and the second half array register vrN+1 to be accessed by the preceding word command. Based on the determination results thereof, the command issuance control circuit 202 sets the issuance determination value ID in accordance with the correspondence relation illustrated in FIG. 11A. After setting of the issuance determination value ID, the command issuance control circuit 202 proceeds to step S1009.

Also, in step S1008, the command issuance control circuit 202 performs determination of register interference between the preceding command and the subsequent command. Based on the determination result, the command issuance control circuit 202 sets the issuance determination value ID in accordance with the correspondence relation illustrated in FIG. 11B. After setting of the issuance determination value ID, the command issuance control circuit 202 proceeds to step S1009.

Now, the details of the issuance determination value ID will be described. The issuance determination value ID is a parameter for determining whether or not the subsequent command is issued at the next cycle. When the issuance determination value ID is equal to or smaller than zero (ID 0), the command issuance control circuit 202 issues the subsequent command at the next cycle.

FIGS. 11A and 11B are diagrams illustrating an issuance determination value ID setting method. The issuance determination value ID is determined by a penalty cycle PC1 to be set according the type of the preceding command, a penalty cycle PC2 according to the number of cycles from the processing start cycle as to the first half array register of the preceding command (the head cycle of the preceding command) to the processing start cycle as to the second half array register (a non-head cycle of the preceding command), and difference cycle DC between the head cycle and the current cycle (cycle when the processing flow 1000 is executed) of the preceding word command to be processed. The penalty cycles PC1 and PC2 are as described in FIGS. 6, 8A, and 8B. The difference cycle DC represents how many cycles ahead the head cycle of the preceding word command to be processed is as viewed from the current cycle with the processing flow 1000 being executed, and represents distance between the preceding word command to be processed and the current cycle.

FIGS. 11A and 11B illustrate a setting example of the issuance determination value ID in the event that a word command and a half word command are mixed. The setting of the issuance determination value ID differs according to a combination of the data word lengths of mixed commands, and the issuance determination value ID is set according to a combination of data word lengths as appropriate.

FIG. 11A is a diagram illustrating a setting example of the issuance determination value ID in the event that the data word length of the preceding command is longer than the data word length of the subsequent command, the preceding command is a word command, and the subsequent command is a half word command.

When the command issuance control circuit 202 determines that there is no register interference between the preceding word command and the subsequent half word command, the issuance determination value ID is 0. This means that the command issuance control circuit 202 issues the subsequent half word command at the next cycle of the head cycle (processing start cycle) of the preceding command.

On the other hand, when the command issuance control circuit 202 determines that there is register interference between the first half array register vrN to be accessed by the preceding word command and the array register vrM to be accessed by the subsequent half word command, the issuance determination value ID is obtained by subtracting the difference cycle DC from the penalty cycle PC1 (ID=PC1−DC). This means that the command issuance control circuit 202 issues the subsequent half word command at a cycle later by further the penalty cycle PC1 worth from the next cycle of the head cycle (processing start cycle) of the preceding word command.

Also, when the command issuance control circuit 202 determines that there is register interference between the second half array register vrN+1 to be accessed by the preceding word command and the array register vrM to be accessed by the subsequent half word command, the issuance determination value ID is obtained by adding the penalty cycle PC2 to the penalty cycle PC1, and subtracting the difference cycle DC therefrom (ID=PC1+PC2−DC). This means that the command issuance control circuit 202 issues the subsequent half word command at a cycle later by further the penalty cycle PC1 worth from the next cycle of the processing start cycle (a non-head cycle of the preceding word command) as to the second half array register vrN+1 of the preceding word command.

FIG. 11B is a diagram illustrating a setting example of the issuance determination value ID in the event that the data word length of the preceding command and the data word length of the subsequent command are the same. When the command issuance control circuit 202 determines that there is no register interference between the preceding command and the subsequent command, the issuance determination value ID is 0. This means that the command issuance control circuit 202 issues the subsequent command at the next cycle of the head cycle (processing start cycle) of the preceding command.

On the other hand, when the command issuance control circuit 202 determines that there is register interference, the issuance determination value ID is obtained by subtracting the difference cycle DC from the penalty cycle PC1 (ID=PC1−DC). This means that the command issuance control circuit 202 issues the subsequent command at a cycle later by the penalty cycle PC1 worth from the next cycle of the start cycle of the preceding command.

Description will return to FIG. 10, where in step S1009, the command issuance control circuit 202 ends the issuance determination value ID setting processing, and then proceeds to step S1002. In the event that determination is made in step S1002 that the setting of an issuance determination value ID has been completed as to all of the preceding commands being executed, the command issuance control circuit 202 proceeds to step S1010, and in the event that incompletion is determined, proceeds to step S1003, where the issuance determination value ID setting processing will be performed again.

In step S1010, the command issuance control circuit 202 determines whether or not of the issuance determination values ID set in step S1003, there is at least one of which the value is equal to or greater than 1. In the even that there is an issuance determination value ID of which the value is equal to or greater than 1, the command issuance control circuit 202 proceeds to step S1011. In the event that there is no issuance determination value ID of which the value is equal to or greater than 1 (in the event that all of the issuance determination value IDs have a value equal to or smaller than 0), the command issuance control circuit 202 proceeds to step S1013.

In step S1011, the command issuance control circuit 202 determines that the subsequent command has issuance constraint due to register interference with the preceding command, and then proceeds to step S1012.

In step S1012, the command issuance control circuit 202 determines not to issue the subsequent command at the next cycle of the current cycle with the processing flow 1000 being executed. Further, the command issuance control circuit 202 determines to execute the same series of processing as to the same subsequent command again, and then returns to step S1001.

Also, in step S1013, the command issuance control circuit 202 determines that the subsequent command has no issuance constraint due to register interference with the preceding command, and then proceeds to step S1014.

In step S1014, the command issuance control circuit 202 determines whether or not there is issuance constraint other than register interference regarding issuance of the subsequent command. Examples of issuance constraint other than register interference includes hardware resource competition other than the vector register file in the vector processing circuit 200. In the event of determining that there is also not issuance constraint other than register interference, the command issuance control circuit 202 issues the subsequent command at the next cycle of the current cycle.

As described above, after receiving the subsequent command, the command issuance control circuit 202 according to the first embodiment performs determination processing of register interference as to all of the preceding commands being executed for each cycle regarding the subsequent command. The command issuance control circuit 202 sets the issuance determination value ID based on the determination result thereof, thereby determining whether or not the subsequent command may be executed at the next cycle. The issuance determination value ID is suitably set according to multiple modes where register interference occurs.

Accordingly, with the vector processing circuit 200 according to the first embodiment, even when the data word length of the preceding command is longer than the data word length of the subsequent command, whether or not there is register interference may accurately be detected according to multiple register interference modes, and based on the accurate detection result, the issuance timing of the subsequent command may suitably be adjusted. Consequently, even when commands having a different data word length are mixed, efficiency in command issuance may be realized.

2. Second Embodiment

Figure 12:
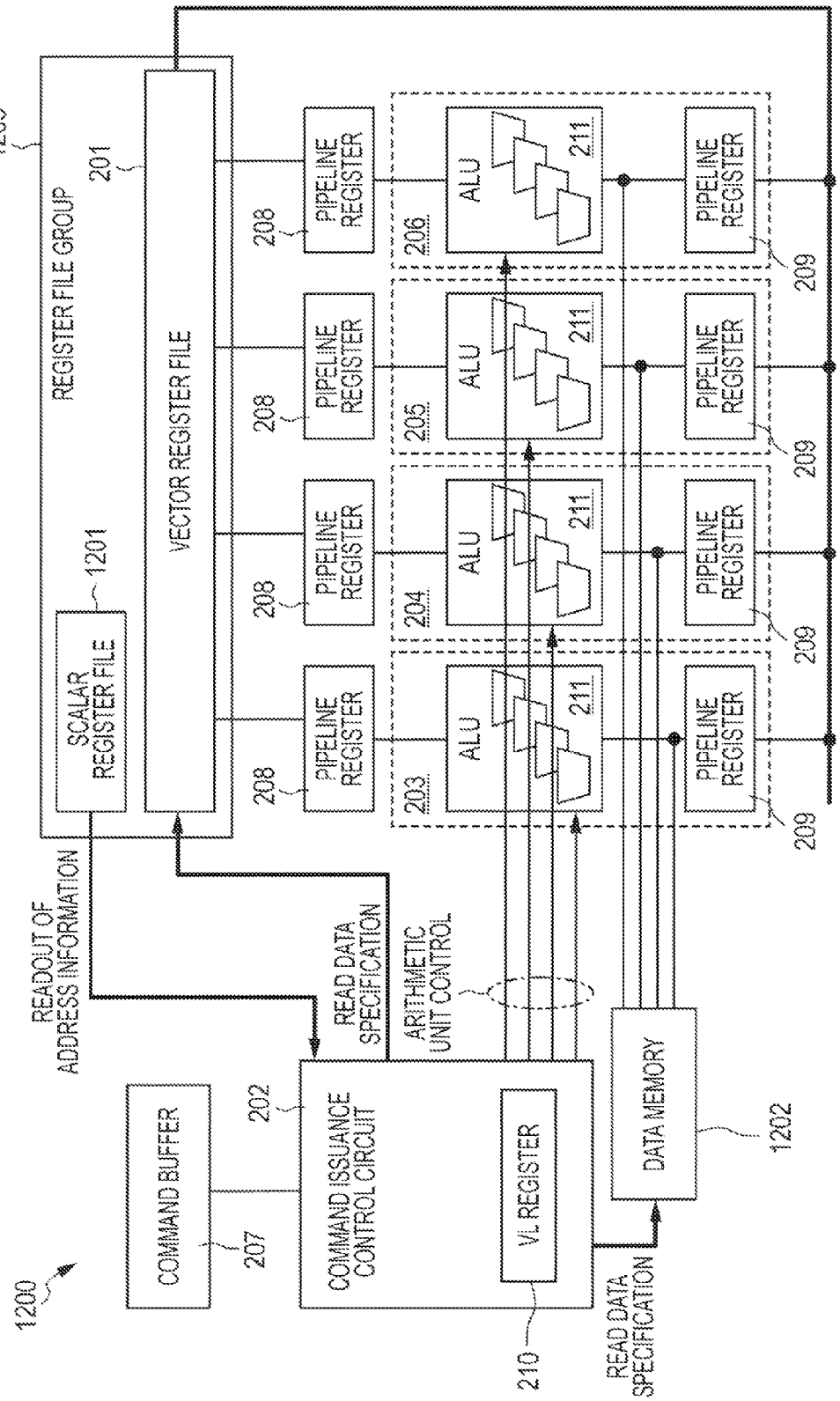
FIG. 12 is a diagram illustrating a configuration example of a vector processing circuit according to a second embodiment.

FIG. 12 is a diagram illustrating a configuration example of a vector processing circuit according to a second embodiment of the present invention. The vector processing circuit 1200 according to the second embodiment illustrated in FIG. 12 and the vector processing circuit 200 according to the first embodiment illustrated in FIG. 2 differ in that the vector processing circuit 1200 includes a scalar register file 1201 and data memory 1202, but are the same regarding other portions. The same or corresponding portions as the vector processing circuit 200 illustrated in FIG. 2 are denoted with the same reference numerals.

A register file group 1203 includes the scalar register file 1201 and the vector register file 201. The scalar register file 1201 stores the address information of the data memory 1202, and supplies the address information thereof in response to the request from the command issuance control circuit 202. The details of the scalar register file 1201 will be described later.

The command issuance control circuit 202 receives the address information of the data memory 1202 from the scalar register file 1201, and specifies the address of data to be read as to the data memory 1202 based on the received address information.

The data memory 1202 stores data that the pipeline arithmetic units 203 through 206 process. The data memory 1202 supplies the data corresponding to the address information specified by the command issuance control circuit 202 to the pipeline register 209. The pipeline register 209 receives the data from the data memory 1202, and supplies the received data to the vector register file 201.

The pipeline processing performed at the vector processing circuit 1200 is the same as that of the vector processing circuit 200 illustrated in FIG. 2, and the register interference determination processing and subsequent command issuance timing adjustment processing performed in the command issuance control circuit 202 are also mutually the same as those thereof.

Figure 13:
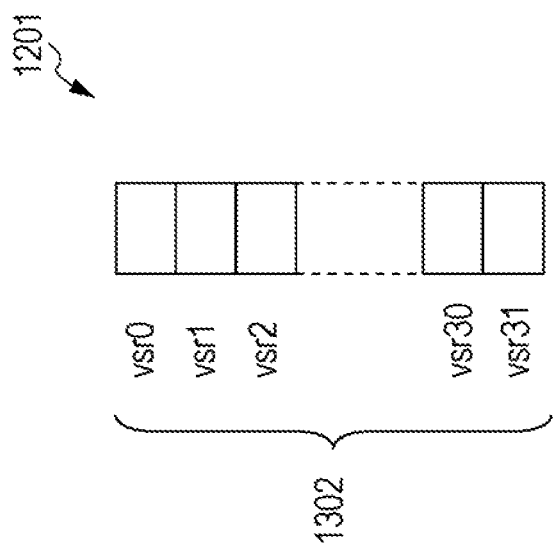
FIG. 13 is a diagram illustrating the details of a scalar register file.

FIG. 13 is a diagram illustrating the details of the scalar register file 1201. The scalar register file 1201 is configured of 32 scalar registers 1302, and one scalar register 1302 is configured of one register element which stores 32-bit data. The scalar registers 1302 store address information on the data memory 1202.

Figure 14:
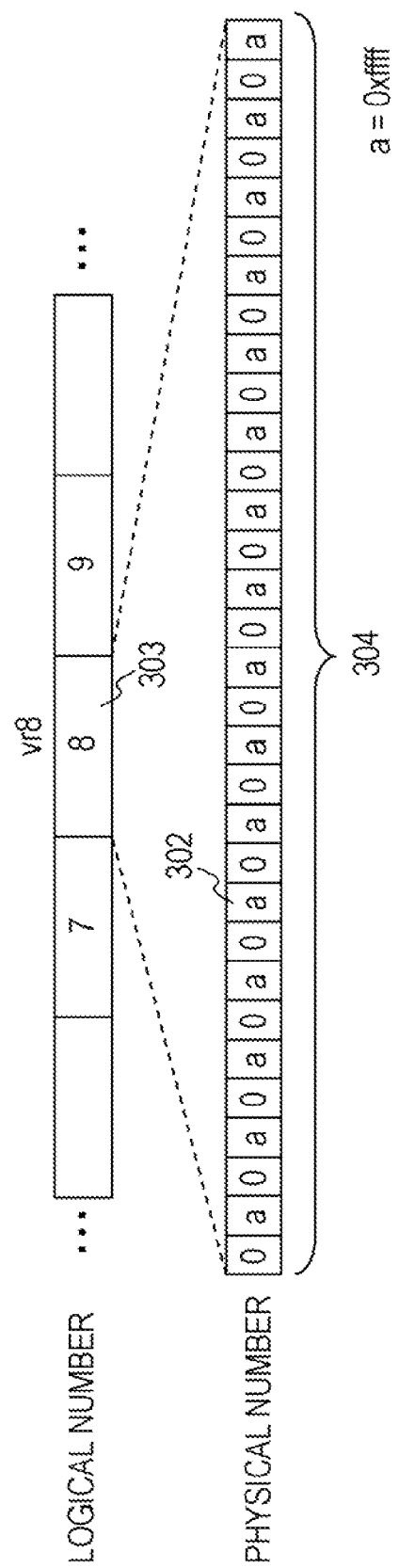
FIG. 14 is a diagram illustrating the content of the vector register file.

FIG. 14 is a diagram illustrating the content of the vector register file 201. Let us say that the data illustrated in FIG. 14 is stored in the vector register file 201 illustrated in FIG. 3 as the array data 304 of the array register vr8 of the logical number 8. With the array register vr8, all of the array elements 302 having an even physical number have the data of "0".

Figure 15:
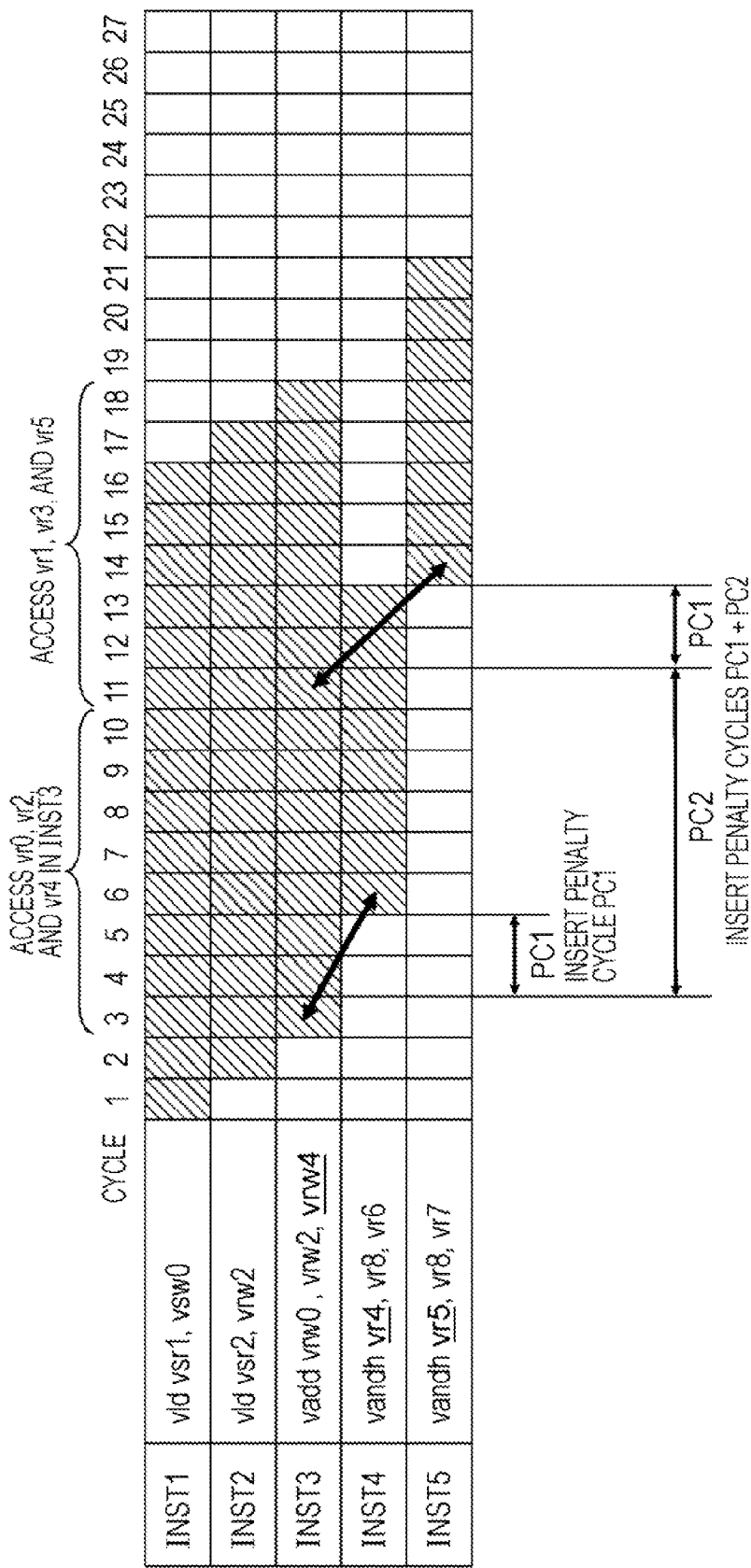
FIG. 15 is a diagram illustrating an example of the operation of a vector processing circuit.

Next, an operation example of the vector processing circuit 1200 according to the second embodiment will be described. FIG. 15 is a diagram illustrating an example of the operation of the vector processing circuit 1200 according to the second embodiment.

First, as a command INST1, a load command (vld) is issued, a scalar register vsr1 is specified as a source thereof, and an array register vrw0 is specified as a destination thereof. Specifically, the command issuance control circuit 202 issues a command for loading (vld) 32 pieces of 32-bit data from the address on the data memory 1202 that the 32-bit data stored in the scalar register vsr1 of the scalar register file 1201 illustrated in FIG. 13 specifies, and storing in pair registers made up of the array register vr0 of the logical number 0, and the array register vr1 of the logical number 1 of the vector register file 201 via the pipeline register 209.

Next, as a command INST2, a load command (vld) is issued, a scalar register vsr2 is specified as a source thereof, and an array register vrw2 is specified as a destination thereof. Specifically, the command issuance control circuit 202 issues a command for loading (vld) 32 pieces of 32-bit data from the address on the data memory 1202 that the 32-bit data stored in the scalar register vsr2 of the scalar register file 1201 illustrated in FIG. 13 specifies, and storing in a pair registers made up of the array register vr2 of the logical number 2, and the array register vr3 of the logical number 3 in the vector register file 201 via the pipeline register 209.

Next, as a command INST3, an addition command (vadd) that is a word command is issued, array registers vrw0 and vrw2 are specified as sources thereof, and an array register vrw4 is specified as a destination thereof. Specifically, the command issuance control circuit 202 issues a command for adding (vadd) the array data 307 of the array register vrw0 of the logical number 0, and the array data 307 of the array register vrw2 of the logical number 2 in the vector register file 201 illustrated in FIG. 3, and storing the data of the addition results in the array register vrw4 of the logical number 4.

The command INST3 adds, with the first half eight cycles, the array data 304 of the array register vr0 of the logical number 0, and the array data 304 of the array register vr2 of the logical number 2, and stores the data of the addition results in the array register vr4 of the logical number 4, and also with the second half eight cycles, adds the array data 304 of the array register vr1 of the logical number 1, and the array data 304 of the array register vr3 of the logical number 3, and stores the data of the addition results in the array register vr5 of the logical number 5.

Next, as a command INST4, an AND command that is a half word command (vandh) is issued, array registers vr4 and vr8 are specified as sources thereof, and an array register vr6 is specified as a destination thereof. Specifically, the command issuance control circuit 202 issues a command for performing an AND operation (vand) regarding the array data 304 of the array register vr4 of the logical number 4, and the array data 304 of the array register vr8 of the logical number 8 in the vector register file 201 illustrated in FIG. 3, and storing the data of the computation results in the array register vr6 of the logical number 6.

Next, as a command INST5, an AND command that is a half word command (vandh) is issued, array registers vr5 and vr8 are specified as sources thereof, and an array element vr7 is specified as a destination thereof. Specifically, the command issuance control circuit 202 issues a command for performing an AND operation (vand) regarding the array data 304 of the array register vr4 of the logical number 5, and the array data 304 of the array register vr8 of the logical number 8 in the vector register file 201 illustrated in FIG. 3, and storing the data of the computation results in the array register vr7 of the logical number 7.

The processing performed by the above-mentioned commands INST1 through INST5 will be summarized as follows. The vector processing circuit 1200 uses the load commands according to the commands INST1 and INST2 to store two sets of 32 pieces of 32-bit data (32 pieces of word data) from the address on the data memory 1202 that two values of the scalar register file 1201 specify in the two array registers 306 of the vector register file 201 respectively, and prepares a state in which the pipeline arithmetic units 203 through 206 may compute. Next, the vector processing circuit 1200 adds the pair of word data stored in the two array registers 306 by the command INST3. Next, the vector processing circuit 1200 performs processing for masking the first half word data (16-bit data) as to each word data (32-bit data) obtained as the addition results by the commands INST4 and INST5. Such processing is frequently performed with a signal processing system application such as wireless baseband processing.

With the example illustrated in FIG. 15, the array register vrw4 is specified as the destination of the word command INST3, and the first half array register vr4 making up the array register vrw4 is also specified as the source of the half word command INST4. In this case, determination is made by the command issuance control circuit 202 that there is register interference between the preceding word command INST3 and the subsequent half word command INST4 at the first half array register vr4. Also, the second half array register vr5 making up the array register vrw4 is also specified as the source of the half word command INST5. In this case, determination is made by the command issuance control circuit 202 that there is register interference between the preceding word command INST3 and the subsequent half word command INST5 at the second half array register vr5. The determination processing of register interference is as described in the example in FIG. 7.

With the example illustrated in FIG. 15, based on the above-mentioned register interference determination result, according to the command issuance control circuit 202, the issuance timing regarding the commands INST4 and INST5 is adjusted as to the command INST3, wherein the processing (RR stage) of the command INST4 starts from cycle 6, and the processing (RR stage) of the command INST5 starts from cycle 14. The command issuance timing adjustment processing is as described in the examples illustrated in FIGS. 6, and 8A through 11B. As a result thereof, all of the processes of the commands INST1 through INST5 may be executed by 21 cycles.

Figure 16:
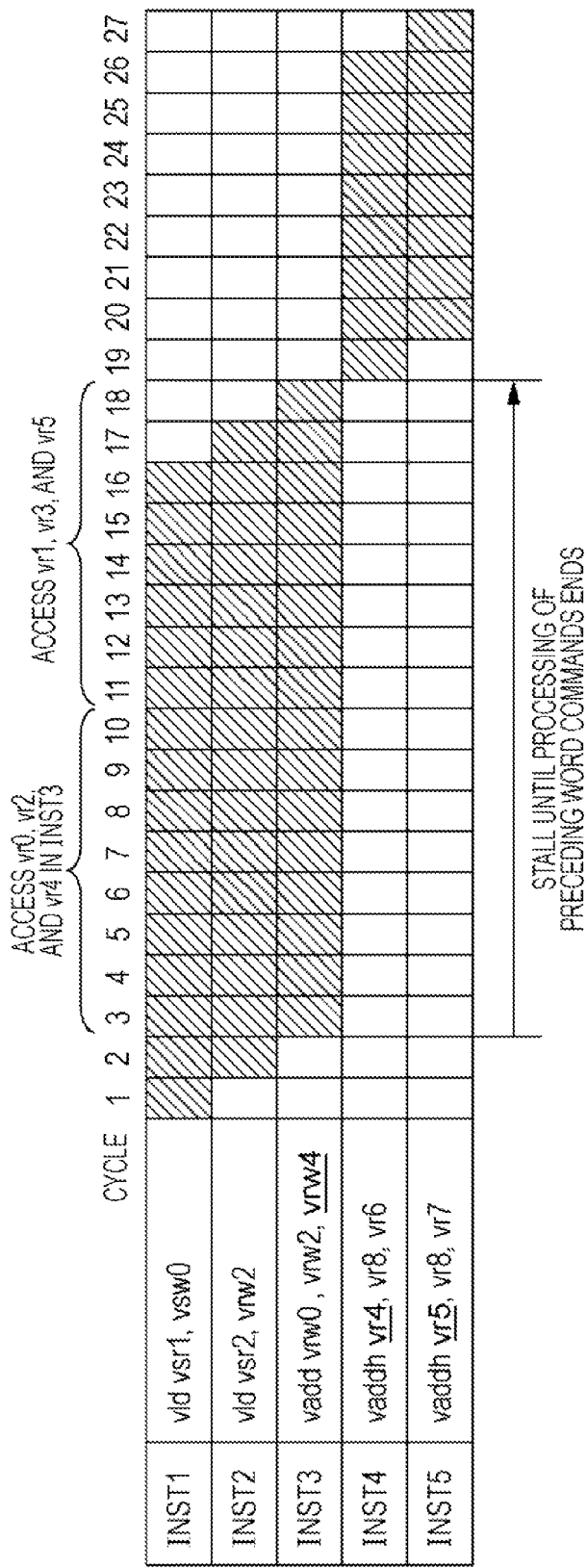
FIG. 16 is a diagram illustrating an example to which command issuance timing adjustment processing according to the related art as to the commands in FIG. 15.

On the other hand, as a comparative example, FIG. 16 illustrates an example wherein the command issuance timing adjustment processing according to the related art has been applied to the commands INST1 through INST5. As illustrated in FIG. 16, in the event of applying the command issuance timing adjustment processing according to the related art, the command issuance control circuit 202 delays issuance of the subsequent half word command INST4 without conditions regardless of whether or not there is register interference so as to stall the subsequent half word command INST4 until the processing of the preceding word command INST3 is completed. Accordingly, the processing of the subsequent half word command INST4 starts from cycle 19, and the subsequent half word command INST5 starts from cycle 20. Consequently, 27 cycles are needed to execute all of the processes of the commands INST1 through INST5.

Accordingly, with the example illustrated in FIG. 15, the vector processing circuit 1200 uses the register interference determination processing and command issuance timing adjustment processing according to the first embodiment, and accordingly, improvement in processing capability by 1.3 times ($\approx=27/21$ times) as compared to a case of the related art may be achieved with the processing frequently occurs at a signal processing system application such as wireless baseband processing.

Thus, even when commands having a different data word length are mixed, efficiency in command issuance may be realized.

3. Third Embodiment

Figure 17:
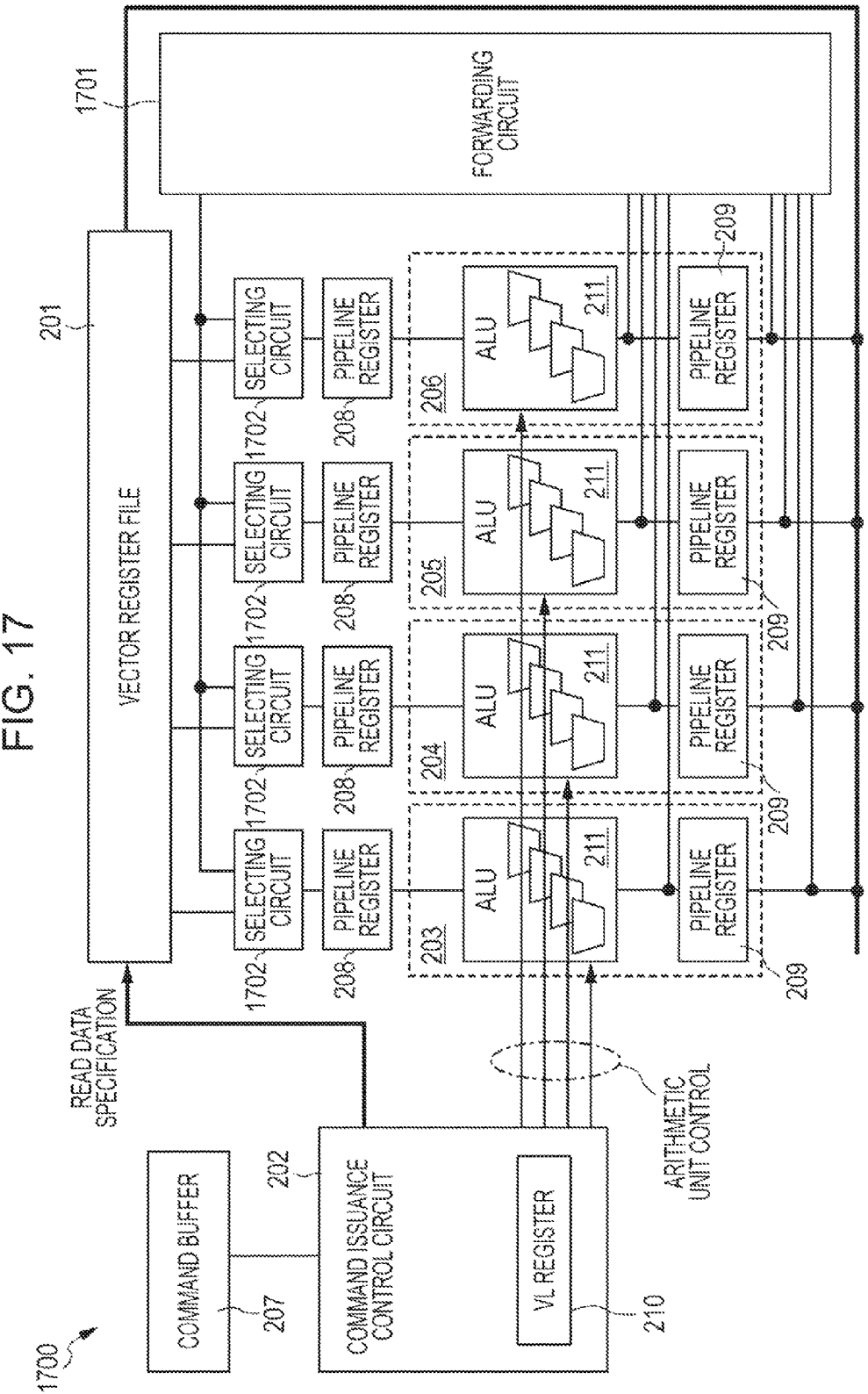
FIG. 17 is a diagram illustrating a configuration example of a vector processing circuit according to a third embodiment.

FIG. 17 is a diagram illustrating a configuration example of a vector processing circuit according to a third embodiment of the present invention. The vector processing circuit 1700 according to the third embodiment illustrated in FIG. 17 differs from the vector processing circuit 200 according to the first embodiment illustrated in FIG. 2 in that the vector processing circuit 1700 includes a forwarding circuit 1701 and a selecting circuit 1702, but other portions are the same. The same or corresponding portions as the vector processing circuit 200 illustrated in FIG. 2 are denoted with the same reference numerals.

The vector processing circuit 1700 illustrated in FIG. 17 may perform forwarding processing in the pipeline processing, but except for performing the forwarding processing, perform the same operation as the vector processing circuit 200 illustrated in FIG. 3. Specifically, the pipeline processing performed in the vector processing circuit 1700 is, except that the forwarding processing is added thereto, the same as that of the vector processing circuit 200 illustrated in FIG. 2, and the processing of determination regarding whether or not there is register interference, and the subsequent command issuance timing adjustment performed in the command issuance control circuit 202 is also mutually the same.

The forwarding processing is processing for performing control so that the computation results not written back to the vector register file 201 but generated at the pipeline arithmetic units 203 through 206 are used as the source of a command to be issued at the next cycle. With the example illustrated in FIG. 17, the forwarding processing is performed by the forwarding circuit 1701 and the selecting circuit 1702 collaborating.

The forwarding circuit 1701 receives the data of the four pipeline registers 209 which store the computation results of the ALU 211. Also, the forwarding circuit 1701 receives the data of the computation results of the four ALUs 211 without passing through the pipeline register 209. The forwarding circuit 1701 supplies the received data to the selecting circuits 1702 without passing through the vector register file 201.

The selecting circuit 1702 is provided between the vector register file 210 and the pipeline register 208 for each of the pipeline arithmetic units 203 through 206. The selecting circuit 1702 receives the data from the forwarding circuit 1701 and vector register file 201, selects one data out of the received plurality of data based on the control of the command issuance control circuit 202, and supplied to the corresponding ALU 211.

With the vector processing circuit 1700 illustrated in FIG. 17, the forwarding processing is performed using the forwarding circuit 1701 and selecting circuit 1702, and accordingly, the computation results that the ALU 211 executed on the EX stage may be used without writing back to the vector register file 201. Accordingly, when the subsequent command uses the data to the computation results of the preceding command, the vector processing circuit 1700 does not have to wait for the processing of the WB stage for writing back the data of the computation results to the vector register file 201 ending.

Consequently, even when there is register interference between the preceding command and the subsequent command, the vector processing circuit 1700 does not have to wait for the processing of the WB stage of the preceding command ending when issuing a subsequent command. Specifically, in the event that the forwarding processing takes the data of the above-mentioned four pipeline registers 209 as objects, there is no need to take one cycle worth used for performing the processing of the WB stage into consideration. Also, in the event that the forwarding processing takes the data of the computation results of the above-mentioned four ALUs 211 as objects, there is no need to take two cycles worth used for performing the processing of the EX and WB stages into consideration.

Accordingly, there is no need to take a cycle used for performing the processing in the EX and WB stages into consideration as a penalty cycle, and accordingly, the number of penalty cycles PC1 in FIGS. 6, 8A, 8B, 11A, 11B, 15, and others may be reduced.

Accordingly, with the vector processing circuit 1700 according to the third embodiment illustrated in FIG. 17, the number of penalty cycles to be inserted into the subsequent command may be reduced in the event that there is register interference between the preceding command and the subsequent command, by combining the command issuance timing adjustment processing according to the first embodiment described in FIGS. 6, 8A, 8B, 11A, 11B, 15, and others with the forwarding processing, and thus, the issuance timing of the subsequent command may further be accelerated as compared to the vector processing circuit 200 according to the first embodiment. Accordingly, even when commands having a different data word length are mixed, efficiency in command issuance may further be improved.

Note that, in the same way as the vector processing circuit 200 illustrated in FIG. 3, even with the vector processing circuit 1700 as well, a memory access MA (Memory Access) stage may be provided between the EX stage and the WB stage which performs reading or writing of data as to external memory (not illustrated) of the vector processing circuit 1700. In the event of providing to the MA stage, a pipeline register for storing the processing results of the MA stage is provided, and accordingly, an arrangement may be made wherein the forwarding circuit 1701 receives the data of the pipeline register thereof without passing through the vector register file 201, and supplies to the selecting circuits 1702.

4. Fourth Embodiment

Figure 18:
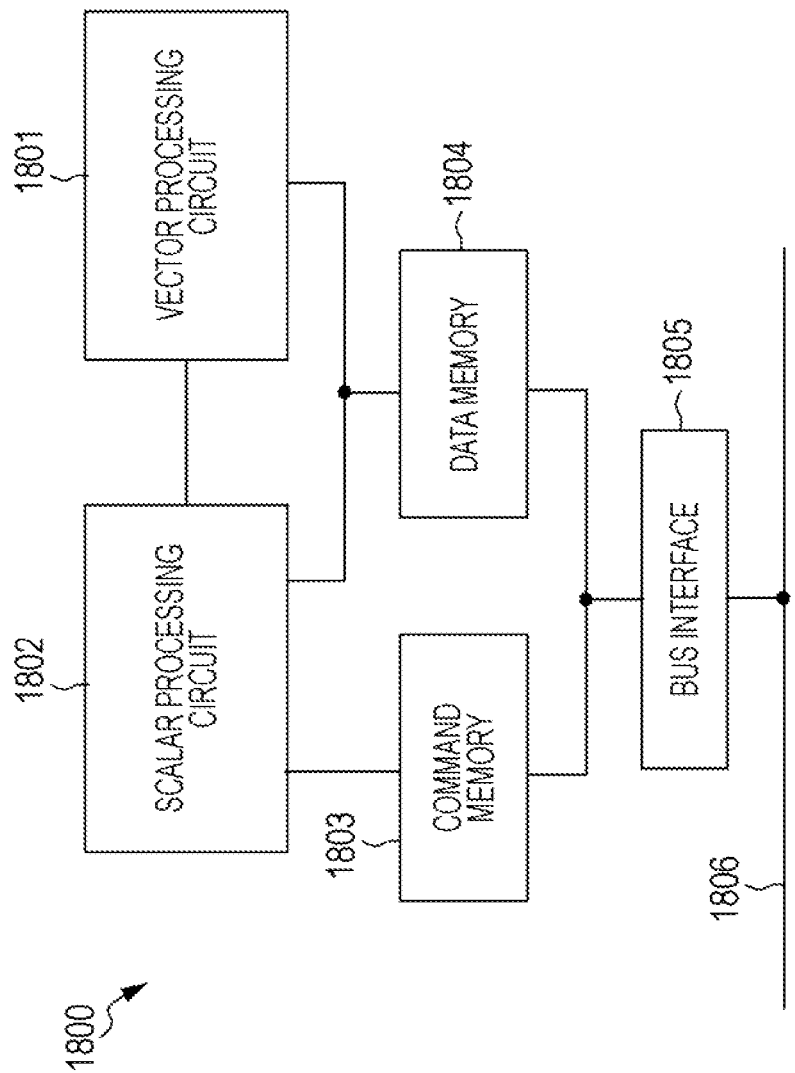
FIG. 18 is a diagram illustrating an example of a processor system according to a fourth embodiment.

FIG. 18 is a diagram illustrating an example of a processor system according to a fourth embodiment of the present invention. The processor system 1800 illustrated in FIG. 18 includes a vector processing circuit 1801, a scalar processing circuit 1802, command memory 1803, data memory 1804, and a bus interface 1805.

An example of the scalar processing circuit 1802 is a CPU (Central Processing Unit), and is connected to the command memory 1803 and data memory 1804. The scalar processing circuit 1802 receives a command from the command memory 1803, and executes processing according to the received command. Also, in the event of determining that there is processing to be executed by the vector processing circuit 1801 based on the received command, the scalar processing circuit 1802 supplies an internal command for executing the processing thereof to the vector processing circuit 1801.

The vector processing circuit 1801 is connected to the scalar processing circuit 1802 and data memory 1804. The vector processing circuit 1801 receives the above-mentioned internal command from the scalar processing circuit 1802, and executes processing according to the received internal command. The scalar processing circuit 1802 and vector processing circuit 1801 performs exchange of data necessary for processing according to the above-mentioned internal command via the data memory 1804. As the vector processing circuit 1801, one of the vector processing circuits 200, 1200, and 1700 illustrated in FIGS. 2, 12, and 17.

The command memory 1803 and data memory 1804 are, for example, RAM, and connected to the bus interface 1805. The bus interface 1805 is connected to the bus 1806. The command memory 1803 receives a command via the bus 1806 and bus interface 1805.

The processor system 1800 illustrated in FIG. 18 is used for a built-in device, wherein the scalar processing circuit 1802 serves as a main processing device, and the vector processing circuit 1801 serves as a sub processing device which aids the scalar processing circuit 1802. The vector processing circuit 1801 receives the internal command from the scalar processing circuit 1802 to take care of partial processing of the processing that the scalar processing circuit 1802 has to perform. The vector processing circuit 1801 performs particular signal processing such as wireless baseband processing, for example.

With the example illustrated in FIG. 18, the vector processing circuit 1801 is positioned as a sub processing device in the processor system for a built-in device. Accordingly, with the vector processing circuit 1801, a register with limited capacity alone may be mounted, and an arithmetic unit with limited processing capability alone may be mounted.

On the other hand, with any of the vector processing circuits 200, 1200, and 1700 used as the vector processing circuit 1801, as described in FIGS. 2, 12, and 17, even when commands having a different data word length are mixed, the commands having a different data word length may suitably be processed while using the limited register capacity of the vector register file 201 without waste. Further, whether or not there is register interference may accurately be detected by suitably performing determination of register interference according to difference of multiple register interference modes, and the issuance timing of the subsequent command may suitably be adjusted based on the accurate detection result.

Accordingly, even with the vector processing circuit 1801 for the processor system for a built-in device which has the limited register capacity and processing capability alone, commands having a different data word length may effectively be executed.

With the vector processing circuit according to the above embodiments, even in the event that commands having a different data word length are mixed, according to the mode of a plurality of register interferences, determination of register interference is suitably performed between the preceding command and the subsequent command, whereby whether or not there is register interference may accurately be detected, and the issuance timing of the subsequent command may suitably be adjusted based on the accurate detection result. Accordingly, event in the event that commands having a different data word length are mixed, efficiency in command issuance may be realized.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A vector processing circuit comprising:
a vector register file including a plurality of array elements;
a command issuance control circuit configured to issue commands including a preceding command and a subsequent command following the preceding command; and
a plurality of pipeline arithmetic units each configured to perform, in response to one of the commands, arithmetic processing of data stored in the array elements indicated as a source by the one of the commands in parts through a plurality of cycles and to store a result of the arithmetic processing in the array elements indicated as a destination by the one of the commands in parts through a plurality of cycles,
wherein the command issuance control circuit is further configured to perform operations to:
change data sizes of the array elements in accordance with a data word length of each command;
determine, when a data word length of the preceding command is longer than a data word length of the subsequent command, whether a first register interference and a second register interference exist, the first register interference corresponding to a register interference between a first array element to be processed at a non-head cycle of the preceding command and a second array element to be processed at a head cycle of the subsequent command, the second register interference corresponding to a register interference between a third array element to be processed at a head cycle of the preceding command and the second array element, to adjust an issuance timing of the subsequent command based on a determination result of the first register interference and the second register interference; and
determine, when the data word length of the preceding command is equal to the data word length of the subsequent command, whether the second register interference exists to adjust an issuance timing of the subsequent command based on the determination result of the second register interference.

2. The vector processing circuit according to claim 1, wherein the command issuance control circuit is configured to control pipeline processing by controlling operations of the vector register file and the pipeline arithmetic units based on the command.

3. The vector processing circuit according to claim 2, wherein:
the pipeline processing includes at least a arithmetic stage for performing arithmetic processing of data stored in the array elements, and a write back stage for storing the data of the result of the arithmetic processing in the vector register; and
when determining that there is first register interference, the command issuance control circuit is further configured to adjust the issuance timing of the subsequent command so as not to issue the subsequent command until at least the result of the arithmetic stage of the preceding command for the array element that is determined to have the first register interference is stored in the vector register file at the write back stage.

4. The vector processing circuit according to claim 1, wherein a physical number is assigned to each of the plurality of array elements, wherein the determination of the first register interference is performed by determining whether the physical number of the first array element and the physical number of the second array element match each other.

5. The vector processing circuit according to claim 1, wherein, upon determining that the first register interference exists, the command issuance control circuit is configured to delay the issuance timing of the subsequent command by inserting a first penalty cycle and a second penalty cycle, the first penalty cycle being set in accordance with a type of the preceding command, the second penalty cycle being set in accordance with the number of cycles from a head cycle of the preceding command to the non-head cycle of the preceding command.

6. The vector processing circuit according to claim 1, wherein:
the data word length of the preceding command is a double length of the data word length of the subsequent command, and
the first array element is an array element to be processed at a second half cycle of the preceding command.

7. The vector processing circuit according to claim 1, wherein:
the vector register file includes a plurality of array registers, each of the plurality of array registers being constituted by the array elements grouped in accordance with a vector length;
each of the pipeline arithmetic units is configured to perform, in response to the one of the commands, arithmetic processing of the data stored in the array registers indicated as a source by the one of the commands in parts through a plurality of cycles and to store the result of the arithmetic processing in the array registers indicated as a destination by the one of the commands in parts through a plurality of cycles;
the command issuance control circuit is configured to change data sizes of the array registers in accordance with the data word length of the command; and
when the data word length of the preceding command is longer than the data word length of the subsequent command, the command issuance control circuit is configured to determine whether the first register interference exists.

8. The vector processing circuit according to claim 7, wherein:
a physical number is assigned to each of the plurality of array elements, and a logical number is assigned to each of the plurality of array registers;
the determination of the first register interference is performed by determining whether the physical number of the first array element in the array register having the logical number indicated by the preceding command and the physical number of the second array element in the array register having the logical number indicated by the subsequent command match each other.

9. The vector processing circuit according to claim 8, wherein:
the preceding command is a word command, the subsequent command is a half word command, and the non-head cycle is a second half cycle of the word command;
in case of the word command, the command issuance control circuit is further configured to handle two array elements of which the physical numbers are consecutive as one array element, the physical numbers being assigned for the half word command and to handle two array registers of which the logical numbers are consecutive as one array register, the logical number being assigned for the half word command; and
the determination of the first register interference is performed by determining whether the physical number of the first array element in the array register having the logical number indicated by the word command, and the physical number of the second array element in the array register having the logical number indicated by the half word command match each other.

10. The vector processing circuit according to claim 8, wherein:
the preceding command is a double word command, the subsequent command is a half word command, and the non-head cycle is each of second through fourth quarter cycles of the double word command;
in case of the double word command, the command issuance control circuit is further configured to handle four array elements of which the physical numbers are consecutive as one array element, the physical numbers being assigned for the half word command and to handle four array registers of which the logical numbers are consecutive as one array register, the logical numbers being assigned to the half word command; and
determination of the first register interference is performed by determining whether the physical number of the first array element in the array register having the logical number indicated by the double word command, and the physical number of the second array element in the array register having the logical number indicated by the half word command match each other.

11. The vector processing circuit according to claim 7, wherein:
the command includes a command code, source information indicating the array register corresponding to a source of the command code, and destination information indicating the array register corresponding to a destination of the command code; and
the command issuance control circuit is further configured to determine whether the first register interference exists between the array register indicated by the destination information of one of the preceding command and the subsequent command, and the array register indicated by the source information or the destination information of the other command.

12. The vector processing circuit according to claim 1, further comprising:
a scalar register file including a plurality of scalar registers; and
a data memory configured to store data; wherein data in the data memory indicated by the scalar register is provided for the vector register file.

13. The vector processing circuit according to claim 1, further comprising:
a forwarding circuit configured to receive the data of the arithmetic processing results of the pipeline arithmetic units without passing through the vector register file and to provide the received data for the pipeline arithmetic units without passing through the vector register file.

14. A vector processing circuit comprising:
a vector register file including a plurality of array elements;
a command issuance control circuit configured to issue commands including a preceding command and a subsequent command following the preceding command; and
a plurality of pipeline arithmetic units each configured to perform, in response to one of the commands, arithmetic processing of data stored in the array elements indicated as a source by the one of the commands in parts through a plurality of cycles and to store the result of the arithmetic processing in the array elements indicated as a destination by the one of the commands in parts through a plurality of cycles, wherein the command issuance control circuit is further configured to perform operations to:
change data sizes of the array elements in accordance with a data word length of each command;
determine, when a data word length of the preceding command is longer than a data word length of the subsequent command, whether a first register interference and a second register interference exist, the first register interference corresponding to a register interference between a second array element to be processed at X'th cycle of the subsequent command, the X being an integer equal to or greater than 1, and a first array element to be processed at Y'th cycle of the preceding command, the Y being an integer greater than the X, the second register interference corresponding to a register interference between a third array element to be processed at the X'th cycle of the preceding command and the second array element, to adjust an issuance timing of the subsequent command based on the determination result of the first register interference and the second register interference; and
determine, when the data word length of the preceding command is equal to the data word length of the subsequent command, whether the second register interference exists to adjust an issuance timing of the subsequent command on the basis of the determination result of the second register interference.

15. The vector processing circuit according to claim 14, wherein the integer Y is greater than the number of cycles Z that is necessary for performing arithmetic processing of data stored in a plurality of the array elements indicated by the subsequent command.

16. The vector processing circuit according to claim 15, wherein the integer Y satisfies a relationship as follows: Y=X+n×Z, where X and Z are integers, and n is an integer equal to or greater than 1.

17. A method for controlling issuance of commands including a preceding command and a subsequent command following the preceding command in a vector processing circuit including a vector register file including a plurality of array elements and a plurality of pipeline arithmetic units, the method comprising:
performing, by each of the pipeline arithmetic units, in response to one of the commands, arithmetic processing of data stored in the array elements indicated as a source by the one of the commands in parts through a plurality of cycles and storing the result of the arithmetic processing in the array elements indicated as a destination by the one of the commands in parts through a plurality of cycles;
changing data sizes of the array elements in accordance with a data word length of each command;
determining, by a control circuit, when a data word length of the preceding command is longer than a data word length of the subsequent command, whether a first register interference and a second register interference exist, the first register interference corresponding to a register interference between a first array element to be processed at a non-head cycle of the preceding command and a second array element to be processed at the head cycle of the subsequent command, the second register interference corresponding to a register interference between a third array element to be processed at a head cycle of the preceding command and the second array element, to adjust an issuance timing of the subsequent command based on the determination result of the first register interference and the second register interference; and determining, by the control circuit, when the data word length of the preceding command is equal to the data word length of the subsequent command, whether the second register interference exists to adjust an issuance timing of the subsequent command based on the determination result of the second register interference.

18. The method according to claim 17, the method further comprising:

obtaining, by the control circuit, an issuance determination value for the preceding command based on a type of the preceding command, the number of cycles from a head cycle of the preceding command to the non-head cycle of the preceding command, and a difference between the head cycle of the preceding command and a current cycle in the determination of the register interference; and determining, by the control circuit, the issuance timing of the subsequent command based on the issuance determination value.

19. A processor system comprising:

a bus;

a command memory coupled to the bus and configured to store a command;

a scalar processing circuit coupled to the command memory and configured to receive the command stored in the command memory to execute data processing;

a vector processing circuit coupled to the scalar processing circuit and configured to receive the command from the scalar processing circuit to execute data processing; and a data memory coupled to the bus and configured to transmit data to the scalar processing circuit and the vector processing circuit and receive data from the scalar processing circuit and the vector processing circuit;

wherein the vector processing circuit includes:

a vector register file including a plurality of array elements;

a command issuance control circuit configured to issue commands including a preceding command and a subsequent command following the preceding command; and a plurality of pipeline arithmetic units, each of the pipeline arithmetic units being configured to perform, in response to one of the commands, arithmetic processing of data stored in the array elements indicated as a source by the one of the commands in parts through a plurality of cycles and to store the result of the arithmetic processing in the array elements indicated as a destination by the one of the commands in parts through a plurality of cycles, wherein the command issuance control circuit is further configured to perform operations to:

change data sizes of the array elements in accordance with a data word length of each command;

determine, when a data word length of the preceding command is longer than a data word length of the subsequent command, whether a first register interference and a second register interference exist, the first register interference corresponding to a register interference between a first array element to be processed at a non-head cycle of the preceding command and a second array element to be processed at a head cycle of the subsequent command, the second register interference corresponding to a register interference between a third array element to be processed at a head cycle of the preceding command and the second array element, to adjust an issuance timing of the subsequent command on the basis of the determination result of the first register interference and the second register interference; and determine, when the data word length of the preceding command is equal to the data word length of the subsequent command, whether the second register interference exists to adjust an issuance timing of the subsequent command on the basis of the determination result of the second register interference.

* * * * *